(12) United States Patent
Macaluso

(10) Patent No.: US 11,837,411 B2
(45) Date of Patent: Dec. 5, 2023

(54) HYPERCAPACITOR SWITCH FOR CONTROLLING ENERGY FLOW BETWEEN ENERGY STORAGE DEVICES

(71) Applicant: Anthony Macaluso, San Diego, CA (US)

(72) Inventor: Anthony Macaluso, San Diego, CA (US)

( * ) Notice: Subject to any disclaimer, the term of this patent is extended or adjusted under 35 U.S.C. 154(b) by 0 days.

(21) Appl. No.: 17/870,667

(22) Filed: Jul. 21, 2022

(65) Prior Publication Data
US 2022/0359120 A1 Nov. 10, 2022

Related U.S. Application Data

(63) Continuation-in-part of application No. 17/541,159, filed on Dec. 2, 2021, which is a continuation of
(Continued)

(51) Int. Cl.
*H02J 7/34* (2006.01)
*H01G 4/228* (2006.01)
(Continued)

(52) U.S. Cl.
CPC ............. *H01G 4/228* (2013.01); *B60L 50/40* (2019.02); *B60L 53/38* (2019.02); *H02J 7/345* (2013.01); *H02J 2207/50* (2020.01)

(58) Field of Classification Search
CPC ......... H01G 4/228; B60L 50/40; B60L 53/38; H02J 7/345; H02J 2207/50
See application file for complete search history.

(56) References Cited

U.S. PATENT DOCUMENTS

| 2,451,965 A | 10/1948 | Longenecker |
| 2,660,443 A | 11/1953 | Miller |
| (Continued) | | |

FOREIGN PATENT DOCUMENTS

| CH | 202100372 | 4/2022 |
| CN | 108473063 | 8/2013 |
| (Continued) | | |

OTHER PUBLICATIONS

International Search Report and Written Opinion dated May 3, 2022 in application No. PCT/US2022/011131.
(Continued)

*Primary Examiner* — Richard Isla
*Assistant Examiner* — Johali A Torres Ruiz
(74) *Attorney, Agent, or Firm* — Knobbe, Martens, Olson & Bear, LLP

(57) ABSTRACT

The disclosure is directed to methods and systems for a battery configured to store a first energy in a chemical form of the battery at a battery voltage level; an electrical load configured to draw an electrical current from the battery in response to an energy requirement of the electrical load, wherein the battery voltage level is configured to decrease in response to the electrical current being drawn from the battery by the electrical load; and a capacitor module in electrical communication with the battery and configured to store a second energy as an electric field of the capacitor module at a capacitor voltage level. The capacitor module can be in electrical communication with the load via the battery and can be configured to convey at least a portion of the second energy to the battery or to the load in response to a voltage differential between the capacitor voltage level and the battery voltage level exceeding a threshold to prevent the battery voltage level from dropping below a battery voltage threshold.

22 Claims, 9 Drawing Sheets

Related U.S. Application Data application No. 17/332,088, filed on May 27, 2021, now Pat. No. 11,222,750.

(60) Provisional application No. 63/164,474, filed on Mar. 22, 2021.

(51) Int. Cl.
*B60L 53/38* (2019.01)
*B60L 50/40* (2019.01)

(56) References Cited

U.S. PATENT DOCUMENTS

| | | |
|---|---|---|
| 3,859,589 A | 1/1975 | Rush |
| 3,891,044 A | 6/1975 | Tiede |
| 3,943,370 A | 3/1976 | Watanabe |
| 3,961,678 A | 6/1976 | Hirano et al. |
| 3,978,936 A | 9/1976 | Schwartz |
| 4,214,160 A | 7/1980 | Fies et al. |
| 4,314,160 A | 2/1982 | Boodman et al. |
| 4,364,448 A | 12/1982 | Ikuma |
| 4,404,513 A | 9/1983 | Campen |
| 4,476,947 A | 10/1984 | Rynbrandt |
| 4,539,496 A | 9/1985 | Thomas et al. |
| 4,579,188 A | 4/1986 | Facer |
| 5,045,646 A | 9/1991 | Musachio |
| 5,078,227 A | 1/1992 | Becker |
| 5,086,857 A | 2/1992 | Dale |
| 5,105,776 A | 4/1992 | Tsuchiya |
| 5,316,101 A | 5/1994 | Gannon |
| 5,412,293 A | 5/1995 | Minezawa et al. |
| 5,491,390 A | 2/1996 | McGreen |
| 5,671,821 A | 9/1997 | McGreen |
| 5,680,907 A | 10/1997 | Weihe |
| 5,710,504 A | 1/1998 | Pascual et al. |
| 5,735,363 A | 4/1998 | Horovitz et al. |
| 5,767,663 A | 6/1998 | Lu |
| 5,921,334 A | 7/1999 | Al-Dokhi |
| 5,992,553 A | 11/1999 | Morrison |
| 6,064,178 A | 5/2000 | Miller |
| 6,065,557 A | 5/2000 | von Keyserling |
| 6,220,381 B1 | 4/2001 | Damron et al. |
| 6,390,215 B1 | 5/2002 | Kodama |
| 6,502,842 B2 | 1/2003 | Ko |
| 6,531,838 B2 | 3/2003 | Parks |
| 6,703,716 B2 | 3/2004 | Chiu |
| 6,717,280 B1 | 4/2004 | Bienville |
| 6,987,327 B1 | 1/2006 | Lucatero |
| 7,183,746 B1 | 2/2007 | Carter |
| 7,279,799 B1 | 10/2007 | McCauley |
| 7,514,803 B2 | 4/2009 | Wilks |
| 7,547,980 B2 | 6/2009 | Harrison |
| 7,628,236 B1 | 12/2009 | Brown |
| 7,753,010 B2 | 7/2010 | Rutledge |
| 7,913,783 B2 | 3/2011 | Elmaleh |
| 8,063,609 B2 | 11/2011 | Salasoo et al. |
| 8,089,168 B2 | 1/2012 | Chevrette |
| 8,206,263 B2 | 6/2012 | Tsuchikawa |
| 8,347,999 B2 | 1/2013 | Koelsch et al. |
| 8,573,346 B2 | 11/2013 | Duignan |
| 8,643,201 B2 | 2/2014 | Scott |
| 8,712,620 B2 | 4/2014 | Jackson |
| 8,723,344 B1 | 5/2014 | Dierickx |
| 8,872,368 B1 | 10/2014 | Kim et al. |
| 8,907,631 B1 | 12/2014 | Gurries |
| 9,236,761 B2 | 1/2016 | Strothmann |
| 9,242,698 B2 | 1/2016 | Frieden |
| 9,321,357 B2 | 4/2016 | Caldeira et al. |
| 9,376,971 B2 | 6/2016 | Luther et al. |
| 9,415,660 B2 | 8/2016 | Koelsch |
| 9,457,666 B2 | 10/2016 | Caldeira et al. |
| 9,981,553 B2 | 5/2018 | Schafer et al. |
| 10,077,056 B1 | 9/2018 | Fields et al. |
| 10,077,752 B1 | 9/2018 | Lee et al. |
| 10,157,050 B2 | 12/2018 | Kotani et al. |
| 10,293,702 B2 | 5/2019 | Tu et al. |
| 10,513,180 B2 | 12/2019 | Quill |
| 10,664,917 B1 | 5/2020 | Wasserman |
| 10,787,089 B1 | 9/2020 | Macaluso |
| 10,797,564 B1 | 10/2020 | Griggs |
| 10,889,186 B2 | 1/2021 | Schutt |
| 10,903,679 B2 | 1/2021 | Schmalzrieth et al. |
| 11,007,878 B2 | 5/2021 | Kamino et al. |
| 11,072,254 B1 | 7/2021 | Macaluso |
| 11,117,481 B2 | 9/2021 | Macaluso |
| 11,130,415 B2 | 9/2021 | Macaluso |
| 11,133,729 B2 | 9/2021 | Macaluso |
| 11,222,750 B1 | 1/2022 | Macaluso |
| 11,289,974 B2 | 3/2022 | Macaluso |
| 11,299,054 B2 | 4/2022 | Macaluso |
| 11,318,856 B2 | 5/2022 | Macaluso |
| 11,322,311 B2 | 5/2022 | Macaluso |
| 11,458,853 B2 | 10/2022 | Macaluso |
| 11,472,306 B1 | 10/2022 | Macaluso |
| 11,548,399 B1 | 1/2023 | Macaluso |
| 11,551,486 B1 | 1/2023 | Everett et al. |
| 11,577,606 B1 | 2/2023 | Macaluso |
| 11,618,332 B1 | 4/2023 | Macaluso |
| 11,627,449 B2 | 4/2023 | Macaluso |
| 11,628,724 B1 | 4/2023 | Macaluso |
| 11,738,641 B1 | 8/2023 | Macaluso |
| 11,757,332 B2 | 9/2023 | Macaluso |
| 2003/0071464 A1 | 4/2003 | Chiu |
| 2003/0139859 A1 | 7/2003 | Hanada |
| 2003/0184258 A1* | 10/2003 | VonderHaar ............ H02J 7/342 |
| | | 320/103 |
| 2004/0012205 A1 | 1/2004 | Sua-An |
| 2004/0262062 A1 | 12/2004 | Berbari et al. |
| 2005/0224263 A1 | 10/2005 | Vasilantone |
| 2006/0238258 A1 | 10/2006 | D'Amore |
| 2007/0075677 A1 | 4/2007 | Alvarez-Troncoso |
| 2007/0090702 A1 | 4/2007 | Schiller |
| 2007/0187957 A1 | 8/2007 | Harrison |
| 2007/0208468 A1 | 9/2007 | Sankaran et al. |
| 2008/0066979 A1 | 3/2008 | Carter |
| 2008/0215700 A1 | 9/2008 | Pillar et al. |
| 2008/0223637 A1 | 9/2008 | Bartilson |
| 2008/0289890 A1 | 11/2008 | Stoltzfus |
| 2008/0297109 A1 | 12/2008 | Sandberg et al. |
| 2009/0033254 A1 | 2/2009 | Nagashima et al. |
| 2009/0079417 A1 | 3/2009 | Mort et al. |
| 2009/0145674 A1 | 6/2009 | Lee |
| 2009/0194998 A1 | 8/2009 | Lin |
| 2009/0230766 A1* | 9/2009 | Miyama ................ H02J 7/1423 |
| | | 307/10.7 |
| 2009/0250276 A1 | 10/2009 | Goodwin et al. |
| 2009/0256450 A1 | 10/2009 | Chevrette |
| 2010/0019718 A1 | 1/2010 | Salasoo et al. |
| 2010/0116574 A1 | 5/2010 | Gilmore |
| 2010/0117600 A1 | 5/2010 | Fazakas |
| 2010/0270810 A1 | 10/2010 | Liebermann et al. |
| 2010/0327600 A1 | 12/2010 | Koelsch |
| 2011/0025068 A1 | 2/2011 | Campbell |
| 2011/0089760 A1 | 4/2011 | Castelaz et al. |
| 2011/0100735 A1 | 5/2011 | Flett |
| 2011/0106329 A1 | 5/2011 | Donnelly et al. |
| 2011/0140518 A1 | 6/2011 | Hattori |
| 2011/0163717 A1 | 7/2011 | Gale |
| 2011/0189507 A1 | 8/2011 | Reis |
| 2011/0200193 A1 | 8/2011 | Blitz et al. |
| 2011/0302078 A1 | 12/2011 | Failing |
| 2011/0320074 A1 | 12/2011 | Erlston et al. |
| 2012/0012406 A1 | 1/2012 | Stoicoviciu |
| 2012/0054095 A1 | 3/2012 | Lesandro et al. |
| 2012/0068537 A1 | 3/2012 | Hintz et al. |
| 2012/0237799 A1 | 9/2012 | Jiang |
| 2012/0309455 A1 | 12/2012 | Klose et al. |
| 2013/0067253 A1 | 3/2013 | Tsuda |
| 2013/0081886 A1 | 4/2013 | Jaberian |
| 2013/0096759 A1 | 4/2013 | Breton et al. |
| 2013/0119665 A1 | 5/2013 | Berbari |
| 2013/0257144 A1 | 10/2013 | Caldeira et al. |
| 2013/0257145 A1 | 10/2013 | Caldeira et al. |
| 2013/0266826 A1 | 10/2013 | Cowperthwaite |

(56) References Cited

U.S. PATENT DOCUMENTS

| | | | |
|---|---|---|---|
| 2013/0332014 A1 | 12/2013 | Jackson | |
| 2014/0091573 A1 | 4/2014 | Berbari | |
| 2014/0132155 A1 | 5/2014 | Strothmann | |
| 2014/0197780 A1 | 7/2014 | Imamura | |
| 2014/0210398 A1 | 7/2014 | Powell | |
| 2014/0244082 A1 | 8/2014 | Caron | |
| 2014/0266004 A1* | 9/2014 | Andrews, Jr. | B60L 58/12 320/108 |
| 2014/0266070 A1* | 9/2014 | Kurtzman | H02J 7/345 320/149 |
| 2014/0283092 A1 | 9/2014 | Mowatt et al. | |
| 2014/0285209 A1 | 9/2014 | Stichowski et al. | |
| 2014/0350764 A1 | 11/2014 | Arai et al. | |
| 2014/0368041 A1 | 12/2014 | Tu et al. | |
| 2015/0008867 A1* | 1/2015 | Smychkovich | H02J 7/00 320/137 |
| 2015/0014991 A1 | 1/2015 | Al Jaeedi et al. | |
| 2015/0089981 A1 | 4/2015 | Renfro | |
| 2015/0197780 A1 | 7/2015 | Xu | |
| 2015/0210287 A1 | 7/2015 | Penilla et al. | |
| 2015/0222553 A1 | 8/2015 | Macdonald et al. | |
| 2015/0249362 A1 | 9/2015 | Bridgelall et al. | |
| 2015/0260835 A1 | 9/2015 | Widmer et al. | |
| 2015/0262154 A1 | 9/2015 | Wolfson | |
| 2015/0343909 A1 | 12/2015 | Hikiri | |
| 2015/0347121 A1 | 12/2015 | Harumoto | |
| 2015/0363855 A1 | 12/2015 | Wu et al. | |
| 2016/0034952 A1 | 2/2016 | Parkin et al. | |
| 2016/0071338 A1 | 3/2016 | McQuade et al. | |
| 2016/0089981 A1 | 3/2016 | Kodawara | |
| 2016/0111907 A1 | 4/2016 | Lynds | |
| 2016/0164373 A1 | 6/2016 | Liao et al. | |
| 2016/0189311 A1 | 6/2016 | Erickson et al. | |
| 2016/0236578 A1 | 8/2016 | Liao | |
| 2016/0243960 A1 | 8/2016 | Wood | |
| 2016/0297317 A1 | 10/2016 | Huang et al. | |
| 2016/0348788 A1 | 12/2016 | Lemmers | |
| 2017/0036551 A1 | 2/2017 | Wu | |
| 2017/0063124 A1 | 3/2017 | Yu et al. | |
| 2017/0077534 A1 | 3/2017 | Guidry et al. | |
| 2017/0117720 A1 | 4/2017 | Yung | |
| 2017/0131999 A1 | 5/2017 | Dolby et al. | |
| 2017/0142766 A1 | 5/2017 | Kim | |
| 2017/0176540 A1 | 6/2017 | Omi | |
| 2017/0191459 A1* | 7/2017 | Zhang | H02J 7/345 |
| 2017/0363433 A1 | 12/2017 | Tennent et al. | |
| 2017/0366017 A1 | 12/2017 | Clay et al. | |
| 2018/0009329 A1 | 1/2018 | Tellez | |
| 2018/0083469 A1* | 3/2018 | Bauer | F02N 19/001 |
| 2018/0154779 A1* | 6/2018 | Chol | H02J 7/345 |
| 2018/0156144 A1 | 6/2018 | Inoue | |
| 2018/0166750 A1 | 6/2018 | Chang | |
| 2018/0204173 A1 | 7/2018 | Painter et al. | |
| 2018/0204253 A1 | 7/2018 | Painter et al. | |
| 2018/0204281 A1 | 7/2018 | Painter et al. | |
| 2018/0205242 A1 | 7/2018 | Kelly-Morgan et al. | |
| 2018/0215272 A1 | 8/2018 | Vitullo et al. | |
| 2018/0254732 A1 | 9/2018 | Smolenaers | |
| 2018/0312159 A1 | 11/2018 | Jent, II | |
| 2018/0328745 A1 | 11/2018 | Nagy et al. | |
| 2018/0351397 A1 | 12/2018 | Aharoni | |
| 2018/0370537 A1 | 12/2018 | Wu | |
| 2019/0001804 A1 | 1/2019 | Wilhide | |
| 2019/0004580 A1 | 1/2019 | Wilhide | |
| 2019/0044359 A1 | 2/2019 | Gordon et al. | |
| 2019/0077254 A1 | 3/2019 | Stanley | |
| 2019/0140245 A1 | 5/2019 | Mensch | |
| 2019/0184843 A1 | 6/2019 | Jung et al. | |
| 2019/0199104 A1 | 6/2019 | Shim | |
| 2019/0217720 A1* | 7/2019 | Treharne | B60L 58/22 |
| 2019/0245375 A1 | 8/2019 | Schmalzrieth et al. | |
| 2019/0292973 A1 | 9/2019 | Jiang et al. | |
| 2019/0329650 A1 | 10/2019 | Quill | |
| 2019/0351895 A1 | 11/2019 | Ben-Ari | |
| 2019/0351899 A1 | 11/2019 | Adam | |
| 2019/0351948 A1 | 11/2019 | Derissaint | |
| 2019/0359080 A1 | 11/2019 | Hellgren | |
| 2019/0362922 A1 | 11/2019 | Bae et al. | |
| 2019/0383627 A1 | 12/2019 | Nangeroni et al. | |
| 2020/0184591 A1 | 1/2020 | Balu et al. | |
| 2020/0039379 A1 | 2/2020 | Schlosser | |
| 2020/0094695 A1 | 3/2020 | Bowman | |
| 2020/0186620 A1 | 6/2020 | Golgiri et al. | |
| 2020/0207209 A1 | 7/2020 | Engel | |
| 2020/0238929 A1 | 7/2020 | Wippler | |
| 2020/0258325 A1 | 8/2020 | Maria | |
| 2020/0295412 A1 | 9/2020 | Chen | |
| 2020/0324763 A1 | 10/2020 | Switkes et al. | |
| 2020/0353839 A1 | 11/2020 | Tarchinski et al. | |
| 2020/0381784 A1 | 12/2020 | Yamamoto | |
| 2020/0384873 A1 | 12/2020 | Macaluso | |
| 2020/0384879 A1 | 12/2020 | Ebisu et al. | |
| 2021/0001737 A1 | 1/2021 | Hoess et al. | |
| 2021/0046833 A1 | 2/2021 | Macaluso | |
| 2021/0065073 A1 | 3/2021 | Maeda et al. | |
| 2021/0080943 A1 | 3/2021 | Iwamoto et al. | |
| 2021/0110323 A1 | 4/2021 | Munoz et al. | |
| 2021/0167988 A1 | 6/2021 | Harata et al. | |
| 2021/0173411 A1 | 6/2021 | Rao et al. | |
| 2021/0183175 A1 | 6/2021 | Dunger | |
| 2021/0188101 A1 | 6/2021 | Abu Qahouq et al. | |
| 2021/0188115 A1* | 6/2021 | Kazuno | B60L 53/14 |
| 2021/0197687 A1* | 7/2021 | Searcy | B60L 50/40 |
| 2021/0229687 A1 | 7/2021 | Hashimoto et al. | |
| 2021/0284043 A1 | 9/2021 | Wang et al. | |
| 2021/0312544 A1 | 10/2021 | Inoue et al. | |
| 2021/0313121 A1 | 10/2021 | Macaluso | |
| 2021/0334913 A1 | 10/2021 | Klein | |
| 2021/0405996 A1 | 12/2021 | Takatsuna et al. | |
| 2022/0016941 A1 | 1/2022 | Sams | |
| 2022/0028625 A1 | 1/2022 | Macaluso | |
| 2022/0028627 A1 | 1/2022 | Macaluso | |
| 2022/0050143 A1 | 2/2022 | Maeda et al. | |
| 2022/0052582 A1 | 2/2022 | Giannotta | |
| 2022/0068570 A1 | 3/2022 | Macaluso | |
| 2022/0111758 A1 | 4/2022 | Ijaz et al. | |
| 2022/0167134 A1 | 5/2022 | Macaluso | |
| 2022/0179641 A1 | 6/2022 | Harata et al. | |
| 2022/0179644 A1 | 6/2022 | Harata et al. | |
| 2022/0209624 A1 | 6/2022 | Macaluso | |
| 2022/0253301 A1 | 8/2022 | Harata et al. | |
| 2022/0261836 A1 | 8/2022 | Kimomura et al. | |
| 2022/0301775 A1 | 9/2022 | Macaluso | |
| 2022/0314837 A1* | 10/2022 | Gupta | H01M 10/6567 |
| 2022/0334818 A1 | 10/2022 | McFarland | |
| 2022/0334822 A1 | 10/2022 | Sakakibara et al. | |
| 2022/0340035 A1 | 10/2022 | Kim et al. | |
| 2022/0360141 A1 | 11/2022 | Macaluso | |
| 2022/0374027 A1 | 11/2022 | Watts et al. | |
| 2023/0005305 A1 | 1/2023 | Sakurai et al. | |
| 2023/0026897 A1 | 1/2023 | Macaluso | |
| 2023/0068432 A1 | 3/2023 | Upadhyay et al. | |
| 2023/0100927 A1 | 3/2023 | Macaluso | |
| 2023/0109674 A1 | 4/2023 | Macaluso | |
| 2023/0125192 A1 | 4/2023 | Macaluso | |
| 2023/0143096 A1 | 5/2023 | Macaluso | |
| 2023/0150380 A1 | 5/2023 | Macaluso | |
| 2023/0154692 A1 | 5/2023 | Macaluso | |
| 2023/0171574 A1 | 6/2023 | Macaluso | |
| 2023/0187145 A1 | 6/2023 | Macaluso | |
| 2023/0286400 A1 | 9/2023 | Macaluso | |

FOREIGN PATENT DOCUMENTS

| | | |
|---|---|---|
| CN | 106846153 | 6/2017 |
| CN | 110549902 | 12/2019 |
| CN | 110633815 | 12/2019 |
| CN | 107804326 | 1/2020 |
| CN | 110889601 | 3/2020 |
| CN | 113479111 | 10/2021 |
| DE | 102017008723 | 5/2018 |
| DE | 102011018457 | 1/2022 |
| EP | 1 253 698 | 10/2002 |
| JP | 2002-257026 | 9/2002 |

(56) References Cited

FOREIGN PATENT DOCUMENTS

| | | |
|---|---|---|
| JP | 2003-278633 | 10/2003 |
| JP | 2011-132873 | 7/2011 |
| JP | 2015-027164 | 2/2015 |
| JP | 2016-170600 | 9/2016 |
| JP | 6687274 | 4/2020 |
| KR | 102266609 | 6/2021 |
| WO | WO 09/149769 | 12/2009 |
| WO | WO 10/133863 | 11/2010 |
| WO | WO 11/148531 | 12/2011 |
| WO | WO 17/030354 | 2/2017 |
| WO | WO 17/213079 | 12/2017 |
| WO | WO 18/046979 | 3/2018 |
| WO | WO 18/083279 | 5/2018 |
| WO | WO 19/117894 | 6/2019 |
| WO | WO 19/219997 | 11/2019 |
| WO | WO 19/240783 | 12/2019 |
| WO | WO 20/191367 | 9/2020 |
| WO | WO 21/187071 | 9/2021 |
| WO | WO 22/015017 | 1/2022 |
| WO | WO 22/219510 | 10/2022 |

OTHER PUBLICATIONS

International Search Report and Written Opinion dated Nov. 5, 2020 in application No. PCT/US2020/036172.
International Search Report and Written Opinion dated May 2, 2022 in application No. PCT/US2022/011141.
International Search Report and Written Opinion dated May 19, 2022 in application No. PCT/US2022/011105.

* cited by examiner

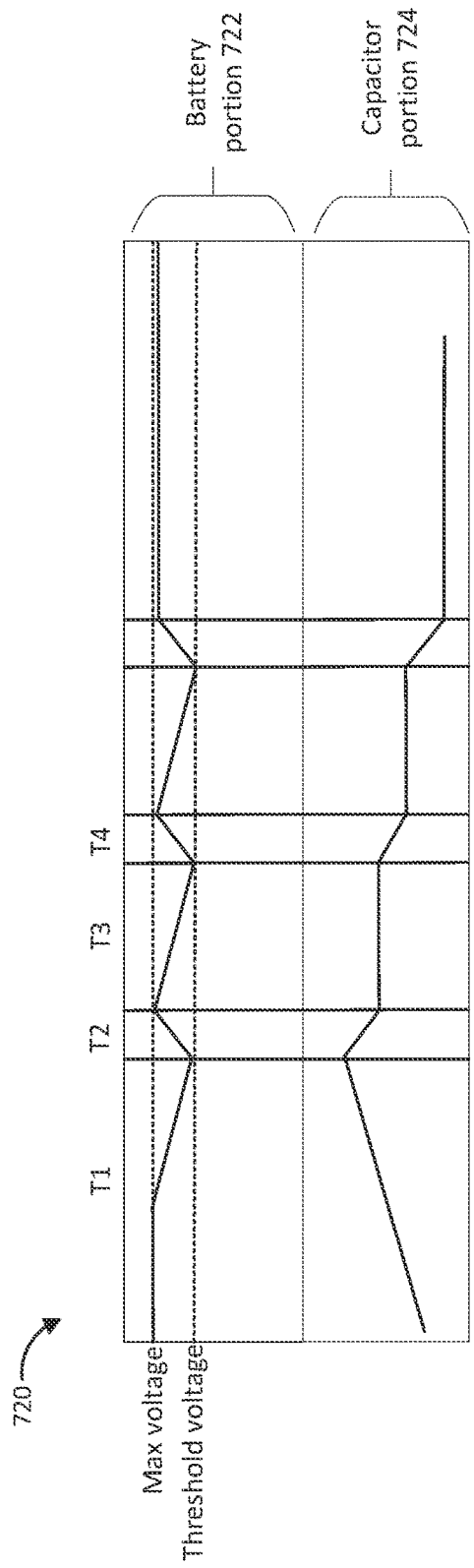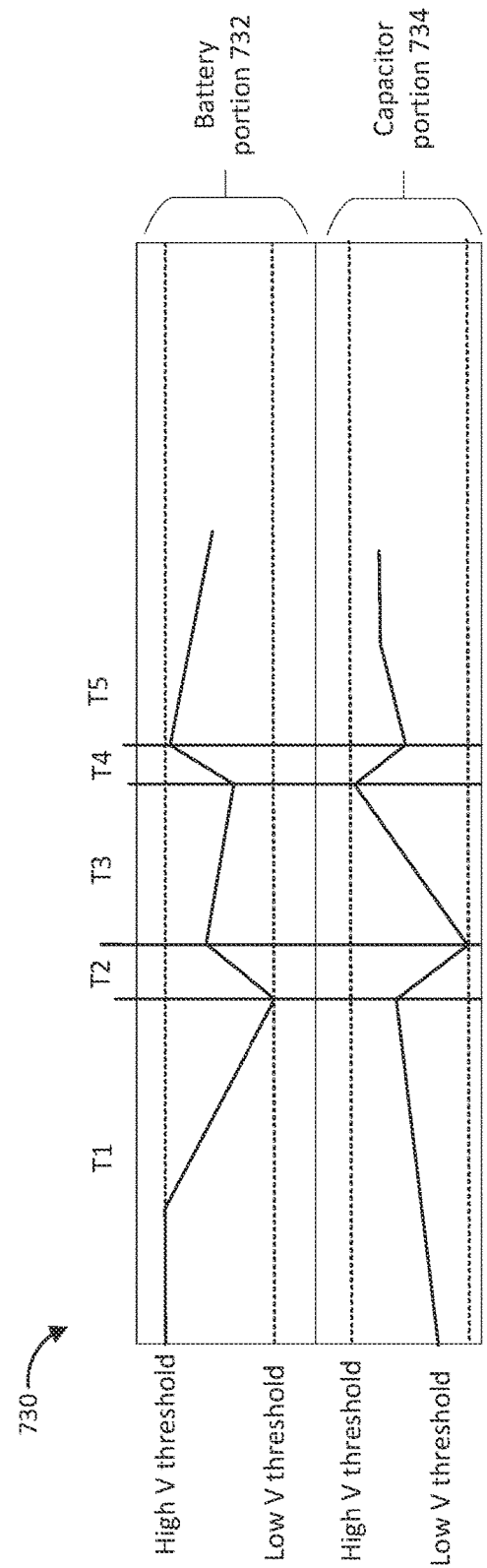

HYPERCAPACITOR SWITCH FOR CONTROLLING ENERGY FLOW BETWEEN ENERGY STORAGE DEVICES

CROSS REFERENCE TO RELATED APPLICATIONS

This application is a continuation-in-part of U.S. patent application Ser. No. 17/541,159, filed Dec. 2, 2021, which is a continuation of U.S. patent application Ser. No. 17/332,088, filed May 27, 2021, now issued as U.S. Pat. No. 11,222,750, which claims benefit of priority to U.S. Provisional Application No. 63/164,474, filed Mar. 22, 2021. The disclosure of each of the aforementioned applications is incorporated herein in its entirety for all purposes.

FIELD OF THE DISCLOSURE

The present disclosure relates generally to systems and devices for receiving, storing and providing energy.

BACKGROUND

Existing energy storage devices, such as batteries and capacitors, can be useful for storing energy but may have many undesirable limitations. For example, batteries such as lithium ion batteries are resilient to self-discharge but often require long charge times (e.g., 12-14 hours). In contrast, capacitors, such as ultracapacitors and supercapacitors are capable of being charged quickly (i.e., faster than batteries) but may be much less resistant to self-discharge than batteries. For example, ultracapacitors/supercapacitors may lose as much as 10-20% of their charge per day due to self-discharge. Further, although ultracapacitors/supercapacitors may be capable of withstanding more charge-discharge cycles than batteries without losing operational functionality, ultracapacitors/supercapacitors may not be capable of storing as much energy per weight as batteries.

In addition, batteries, such as lithium ion batteries present many environmental problems. For example, mining and disposing of lithium are both environmentally destructive. Furthermore, lithium ion batteries are capable of catching fire and burning at high temperatures for long amounts of time, which is also environmentally destructive and hazardous to human health.

SUMMARY

Various embodiments of systems, methods and devices within the scope of the appended claims each have several aspects, no single one of which is solely responsible for the desirable attributes described herein. Without limiting the scope of the appended claims, the description below describes some prominent features.

Details of one or more embodiments of the subject matter described in this specification are set forth in the accompanying drawings and the description below. Other features, aspects, and advantages will become apparent from the description, the drawings, and the claims. Note that relative dimensions of the following figures may not be drawn to scale.

The present disclosure provides a system for managing an energy storage. The system can comprise: an ultracapacitor configured to store a first energy as an electric field of the ultracapacitor; a battery configured to electrically couple to the ultracapacitor and configured to receive energy therefrom to store as an energy of the battery; a switch configured to: operate in an open state or a closed state, electrically couple the battery to the ultracapacitor when in the closed state to conduct an energy between the ultracapacitor and the battery, and electrically disconnect the battery from the ultracapacitor when in the open state to prevent conducting an energy between the ultracapacitor and the battery. The system can further comprise a controller in electrical communication with the switch and configured to cause the switch to transition between the open state and the closed state.

In some embodiments, the system can further comprise a voltage sensor in electrical communication with the ultracapacitor or the battery and configured to detect a voltage level of the ultracapacitor or the battery.

In some embodiments, the controller is in electrical communication with the voltage sensor and configured to: cause the switch to transition to the closed state, in response to determining that the voltage level in the battery is below a low threshold level; and cause the switch to transition to the open state, in response to determining that the voltage level in the battery is above a high threshold level.

In some embodiments, the controller is in electrical communication with the voltage sensor and configured to: cause the switch to transition to the closed state, in response to determining that the voltage level in the ultracapacitor is above a high threshold level, and cause the switch to transition to the open state, in response to determining that the voltage level in the ultracapacitor is below a low threshold level.

In some embodiments, the controller is in electrical communication with the voltage sensor and configured to cause the switch to transition to the closed state, in response to determining that a rate of voltage loss in the battery exceeds a threshold.

In some embodiments, the controller is in electrical communication with the voltage sensor and configured to cause the switch to transition to the closed state, in response to determining that a voltage differential between the ultracapacitor and the battery is above a threshold level.

In some embodiments, the system may further comprise a current sensor in electrical communication with the battery and configured to detect a current or amperage conducted from the battery to the load.

In some embodiments, the controller is in communication with the current sensor and configured to cause the switch to transition to the closed state when a current or amperage conducted from the battery to the load exceeds a threshold level.

In some embodiments, the controller is in communication with the current sensor and configured to cause the switch to transition to the closed state when a rate of change of a current or amperage conducted from the battery to the load exceeds a threshold level.

In some embodiments, the ultracapacitor is configured to electrically couple to an energy source to receive energy therefrom.

In some embodiments, the energy source is an energy generation or regeneration system including a generator.

In some embodiments, the energy source is a power grid, and the ultracapacitor is configured to electrically couple to the power grid via a standard 110 volt outlet and plug.

In some embodiments, the battery is configured to electrically couple to a load, and the load is a vehicle.

In some embodiments, the system may further comprise a second ultracapacitor configured to store a second energy as an electric field of the second ultracapacitor. The battery may be configured to electrically couple to the second ultracapacitor and configured to receive energy therefrom, the switch may be configured to operate in the open state or the closed state or a second closed state or a third closed state. When in the closed state, the switch is further configured to electrically disconnect the battery from the second ultracapacitor to prevent conducting an energy between the second ultracapacitor and the battery. When in the second closed state, the switch is configured to: electrically couple the battery to the second ultracapacitor to conduct an energy between the second ultracapacitor and battery; and electrically disconnect the battery from the ultracapacitor to prevent conducting an energy between the ultracapacitor and the battery. When in the third closed state, the switch is configured to electrically couple the battery to the ultracapacitor and to the second ultracapacitor to conduct an energy from the ultracapacitor and the second ultracapacitor to the battery.

In some embodiments, the controller is configured to cause the switch to transition between the open state, the closed state, the second closed state, or the third closed state based on voltage levels of the ultracapacitor and the second ultracapacitor.

In some embodiments, the controller is configured to cause the switch to transition between the open state and the closed state in response to a user request.

In some embodiments, the controller is configured with settings including conditions for controlling an operation of the switch, and the controller is configured to adjust the settings, according to specifications of the battery or the ultracapacitor, including voltage capacity.

In some embodiments, the battery is removably electrically coupled to the ultracapacitor via one or more wires configured to conduct 100 or more amperes across a 100 volt or more voltage differential.

In some embodiments, the controller is remote to the switch and is configured to communicate wirelessly with the switch.

In some embodiments, the controller is configured to issue a charge to a user in response to performing one or more operations.

The present disclosure provides a method for powering an electrical device during a power outage. The method may comprise: electrically coupling an ultracapacitor to a power grid via a standard 110 volt outlet; receiving at the ultracapacitor, residual transient energy stored within power lines of the power grid at a time when power is not being produced and input into the power grid; storing the residual transient energy as a first energy as an electric field of the ultracapacitor; conveying the first energy from the ultracapacitor to a battery electrically coupled to the ultracapacitor; storing, in a chemical form of the battery, the first energy received from the ultracapacitor as a second energy; and conveying the second energy from the battery to an electrical load, wherein the electrical load is an electrical device configured to consume energy provided from the battery to operate.

In some implementations, the ultracapacitor is electrically coupled to the battery via a switch, the method further comprising conveying the first energy from the ultracapacitor to the battery in response to transitioning the switch to a closed state.

In some implementations, the method may further comprise transitioning the switch to the closed state based on a voltage level of the ultracapacitor or a voltage level of the battery.

In some implementations, the method may further comprise electrically coupling the ultracapacitor to the power grid via a diode, wherein the diode is biased toward the ultracapacitor and configured to: allow electrical current to flow from the power grid to the ultracapacitor, and prevent electrical current from flowing from the ultracapacitor to the power grid.

The present disclosure provides a system for storing and providing energy. The system can comprise: a capacitor module configured to store a capacitor energy as an electric field of the capacitor module; a first battery electrically coupled to the capacitor module via a diode and configured to store a first energy in a chemical form of the first battery, the diode biased toward the first battery and configured to allow energy to pass from the capacitor module to the first battery, and the capacitor module configured to convey at least a portion of the capacitor energy to the first battery in response to a voltage differential between a capacitor voltage level and a battery voltage level exceeding a first threshold; a second battery electrically coupled to the first battery and configured to store a second energy in a chemical form of the second battery, the first battery configured to convey at least a portion of the first energy to the second battery in response to a voltage differential between first battery voltage level and a second battery voltage level exceeding a threshold; and an electrical load electrically coupled to the second battery and configured to draw an electrical current from the second battery in response to an energy requirement of the electrical load, the second battery voltage level configured to decrease in response to the electrical current being drawn from the second battery by the electrical load.

In some embodiments, the first and second batteries are different types of batteries.

In some embodiments, the first battery has a higher specific power than the second battery.

In some embodiments, the first battery has a lower specific energy than the second battery.

The present disclosure provides a system for storing and providing energy. The system can comprise: a battery configured to store a first energy in a chemical form of the battery at a battery voltage level; an electrical load configured to draw an electrical current from the battery in response to an energy requirement of the electrical load, wherein the battery voltage level is configured to decrease in response to the electrical current being drawn from the battery by the electrical load; and a capacitor module in electrical communication with the battery and configured to store a second energy as an electric field of the capacitor module at a capacitor voltage level, wherein the capacitor module is in electrical communication with the load via the battery, wherein the capacitor module is configured to convey at least a portion of the second energy to the battery or to the load in response to a voltage differential between the capacitor voltage level and the battery voltage level exceeding a threshold to prevent the battery voltage level from dropping below a battery voltage threshold.

In some embodiments, the system may further comprise a diode configured with a threshold diode voltage and in electrical communication with the capacitor module and the battery, wherein the diode is configured to convey at least a portion of the second energy from the capacitor module to the battery in response to a voltage differential across the diode exceeding the threshold diode voltage.

In some embodiments, the capacitor module is further configured to convey at least a portion of the second energy to the battery to cause the battery voltage level to increase to charge the battery.

BRIEF DESCRIPTION OF THE DRAWINGS

FIGS. 7A-7D are diagrams illustrating example implementations of various example energy systems.

DETAILED DESCRIPTION

Example Embodiments

Figure 1:
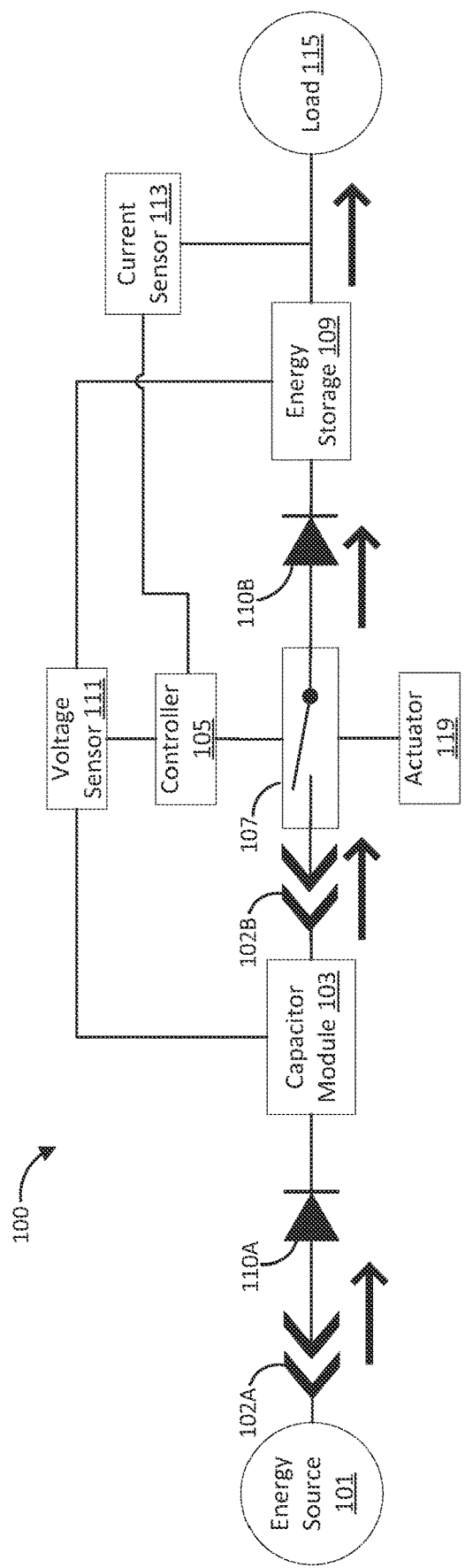
FIG. 1 is a block diagram illustrating an example embodiment of a system for providing and storing energy.

FIG. 1 is a block diagram illustrating an example embodiment of an energy system 100 for providing and storing energy. In this example, the energy system 100 includes an energy source 101, one or more electrical interfaces 102 (e.g., 102A, 102B), a capacitor module 103, a voltage sensor 111, a controller 105, a current sensor 113, a switch 107, an energy storage device 109, a load 115, and one or more diodes 110 (e.g., diodes 110A, 110B). In some embodiments, the energy system 100 may not include or more of the components shown.

In some embodiments the energy source 101 can include an energy generation or regeneration system such as a generator. In some embodiments, the energy source 101 can include a power grid or Mains electricity.

The capacitor module 103 can be electrically coupled to the energy source 101 via an electrical interface 102A. For example, the capacitor module 103 can be removably coupled (electrically, physically) with the energy source 101 via the electrical interface 102A. The electrical interface 102A can include a plug and/or a socket such as a standard 110 volt outlet wall socket configured to receive an electrical plug. The capacitor module 103 can be electrically coupled with the energy source 101 via one or more electrical wires, cables, or cords.

The capacitor module 103 can be electrically coupled with the energy source 101 via a diode 110A. The diode 110A can be biased toward the capacitor module and configured to allow an energy (e.g., a current or amperage) to flow from the energy source 101 to the capacitor module 103. The diode 110A may prevent an energy from flowing from the capacitor module 103 to the energy source 101. Advantageously, the diode 110A may facilitate retaining an energy at the capacitor module 103 when the capacitor module 103 has a higher energy level (e.g., higher voltage) than the energy source energy source 101, such as during a power outage. In some embodiments, more than one diode may be disposed between the energy source 101 and the capacitor module 103.

The capacitor module 103 can include one or more capacitors, ultracapacitors, and/or supercapacitors. A plurality of capacitors in the capacitor module 103 can be electrically connected in series and/or parallel. In some embodiments, the capacitor module 103 can be configured to store up to 400 volts of electrical energy. For example, the capacitor module 103 may store about energy system 100 to 200 volts, about 200 to 300 volts, or about 300 to 400 volts. In some embodiments, the capacitor module 103 can be configured to store less than 100 volts such as about 50 volts or about 25 volts.

The switch 107 can include one or more of an electrical switch, a relay, or the like. The switch 107 can operate according to one or more states including an open state and a closed state. In the closed state, the switch 107 can conduct energy (e.g., current or amperage) such as from the capacitor module 103 to the energy storage 109. In the open state, the switch 107 may not conduct energy (e.g., from the capacitor module 103 to the energy storage 109). The switch 107 may transition between the open and closed states. In some embodiments, the switch 107 transitions between the open and closed states in response to user input via actuator 119. The actuator 119 can include one or more of a button, a switch, a lever, a contact, or the like. In some embodiments, the switch 107 transitions between the open and closed states automatically, such as in response to a signal from the controller 105.

The capacitor module 103 is electrically coupled with the switch 107 via the electrical interface 102B. The electrical interface 102B can include one or more of a plug, a socket, and outlet, or the like. The capacitor module 103 may be removably coupled to the switch 107 via the electrical interface 102B. In some embodiments, the capacitor module 103 may be electrically coupled with the switch 107 via one or more diodes which can include similar operational and/or structural features as the diodes 110 described herein.

The switch 107 is electrically coupled with the energy storage 109. As shown, the switch 107 is electrically coupled to the energy storage 109 via diode 110B. In some embodiments, the energy system 100 may not include diode 110B. In some embodiments, the switch 107 may be electrically coupled to the energy storage 109 via an electrical interface which may include structural and/or operation features similar to electrical interface 102A described herein.

In some embodiments, the energy storage 109 may be electrically coupled to the switch 107 (and/or capacitor module 103) via one or more electrical wires, cables, cords, or the like, which may be configured to withstand high voltages (e.g., 400 volts) and/or high amperage (e.g., 400 amperes). The energy storage 109 may be electrically coupled to the capacitor module 103 via one or more electrical connectors, such as a plug, a socket, or the like. The energy storage 109 and the capacitor module 103 may be removably coupled via the electrical connectors. An example embodiment of an energy storage electrically coupled (e.g., removably coupled) to a capacitor module via electrical connector(s) is shown and discussed, for example, at least with reference to FIG. 6 and corresponding paragraphs of U.S. patent application Ser. No. 17/332,088 which is hereby incorporated by reference in its entirety for all purposes.

When the switch is in the closed state, energy may transfer from the capacitor module 103 to the energy storage 109, such as via the diode 110B. The capacitor module 103 can be electrically connected with the energy storage 109 in series and/or parallel. When a voltage differential between capacitor module 103 and the energy storage 109 exceeds a certain threshold, energy may be amenable to flow from the capacitor module 103 to the energy storage 109. For example, in some embodiments, the diode 110B may be configured with a certain resistance preventing current from passing through the diode 110B until a threshold voltage across the diode 110B is achieved. As the voltage differential across the diode 110B (e.g., between the capacitor module 103 and energy storage 109) increases, the diode 110B may "open" to allow a current to pass in a single direction through the diode 110B.

As shown in this example embodiment, the energy system 100 further includes a controller 105. The controller 105 can include one or more memories configured to store executable instructions (e.g., software instructions) that when executed perform one or more operations. The controller 105 can include one or more hardware processors configured to execute instructions to cause the controller 105 and/or other components of the energy system 100 to perform one or more operations.

In some embodiments, the controller 105 can control an operation of the switch 107. For example, the controller 105 can control the conditions under which the switch 107 transitions between the open and closed states.

The controller 105 is in electrical communication (e.g., wired and/or wireless) with the voltage sensor 111 and the current sensor 113. The controller 105 can be configured to receive one or more signals from the voltage sensor 111 and/or the current sensor 113. For example, the controller 105 may receive voltage signals or current signals. The controller 105 is in electrical communication with the switch 107. The controller 105 may communicate with the switch 107 via a wired and/or wireless connection. For example, the controller 105 may be remote to the switch 107 and may communicate with the switch 107 over a wireless network to control one or more operations of the switch 107. The controller 105 may control the operation of the switch 107 based at least in part on signals received from the voltage sensor 111 and/or the current sensor 113.

The voltage sensor 111 is in electrical communication with the capacitor module 103 and the energy storage 109. The voltage sensor 111 can be configured to determine a voltage at the capacitor module 103 and/or at the energy storage 109. For example, the voltage sensor 111 may be configured to determine that the capacitor module 103 is storing a certain voltage and that the energy storage 109 is storing a certain voltage. In some embodiments, the voltage sensor 111 can be configured to determine a voltage differential between the capacitor module 103 and the energy storage 109. The voltage sensor 111 can communicate signals to the controller 105 indicating voltage levels in the energy system 100 such as at the capacitor module 103 and/or energy storage 109.

The current sensor current sensor 113 is in electrical communication with the energy storage 109. The energy storage 109 can be configured to determine an electrical current or amperage flowing from the energy storage 109 to the load 115. The current sensor 113 can communicate signals to the controller 105 indicating the flow of current or amperage in the energy system 100 such as from the energy storage 109 to the load 115.

The energy storage 109 can include one or more batteries such as lithium ion batteries, lithium polymer batteries, and/or batteries that include one or more other materials for storing energy, such as zinc, carbon, magnesium, manganese, mercury, alkaline, silver, nickel, metal hydride, cadmium, lead, and the like. In some embodiments, the energy storage 109 can include a battery field. In some embodiments, the energy storage 109 can include. In some embodiments, energy storage 109 can be configured to store up to 400 volts of electrical energy. For example, the energy storage 109 may store about 100 to 200 volts, about 200 to 300 volts, or about 300 to 400 volts. In some embodiments, the energy storage 109 can be configured to store less than 100 volts such as about 50 volts or about 25 volts.

In some embodiments, the energy storage 109 may comprise a plurality of batteries, such as a battery field. The plurality of batteries may be electrically connected to one another in series and/or in parallel. An example embodiment of an energy storage including a plurality of batteries is shown and discussed, for example, at least with reference to FIG. 4 and corresponding paragraphs of U.S. patent application Ser. No. 17/332,088 which is hereby incorporated by reference in its entirety for all purposes.

The energy storage 109 is electrically coupled to the load 115. The load 115 may include a device or component configured to consume energy. The load 115 may draw energy from the energy storage 109 as the load 115 operates. For example, the load 115 demand current or amperage from the energy storage 109 depending on the energy requirements of the load 115. As the load 115 draws current or amperage from the energy storage 109, a voltage level of the energy storage 109 may reduce. As the load 115 requires more energy, more current or amperage may be transferred from the energy storage 109 to the load 115 resulting in greater voltage loss at the energy storage 109. In some embodiments, the load 115 may include a vehicle, such as a car, truck, golf cart, tractor, tractor-trailer, or the like. For example, the load 115 may be a motor of a vehicle.

In one example implementation, the capacitor module 103 may be electrically coupled to the energy source 101 via the electrical interface 102A. For example, the capacitor module 103 can be plugged into a standard 110 volt wall outlet via an electrical cord to electrically connect with the power grid. The capacitor module 103 may be electrically coupled with the energy source 101 during a power outage. During a power outage or power blackout, energy may not be generated and/or input into the power grid such as from a power station or energy generation plant. However, a residual amount of transient energy may remain within the power grid such as within power lines, transformers, etc. The residual transient energy can be transferred from the energy source 101 to the capacitor module 103 to charge the capacitor module 103. Advantageously, the diode 110A can allow energy (e.g., current or amperage) to pass to the capacitor module 103 while preventing the backflow of energy to the energy source 101. Advantageously, the capacitor module 103 can be charged from the residual transient energy in the energy source 101 (e.g., power grid) during a power outage without losing energy to the power grid if the voltage in the power grid were to drop below the voltage of the capacitor module 103.

Continuing with the example implementation, the load 115 may include a household appliance. The load 115 may consume energy from the energy storage 109 to operate. During a power outage, it may not be possible to charge the energy storage 109 by connecting the energy storage 109 to the power grid. For example, there may be insufficient power in the power grid to charge the energy storage 109 and/or the energy storage 109 may require too much time to fully charge from the small amount of energy that is in the power grid.

Advantageously, when the energy storage 109 is drained of energy (e.g., voltage has dropped below a threshold level) for example, such that the energy storage 109 can no longer power the load 115 to operate properly, the switch 107 can be transitioned to a closed state to electrically couple the capacitor module 103 with the energy storage 109 to allow energy to flow from the capacitor module 103 to the energy storage 109. Advantageously, the capacitor module 103 requires less energy and less time to charge (such as than a battery) and can charge quickly from a small amount of energy, such as the residual transient energy within power lines of a power grid during a power outage. The capacitor module 103 may thus charge the energy storage 109 to allow the energy storage 109 to continue to provide energy to the load 115 to continue to operate. The capacitor module 103 can continue to receive energy from the energy source 101 (e.g., from the power grid during a power outage), such as when the switch 107 is in the open state or the closed state to continue to charge.

Figure 2:
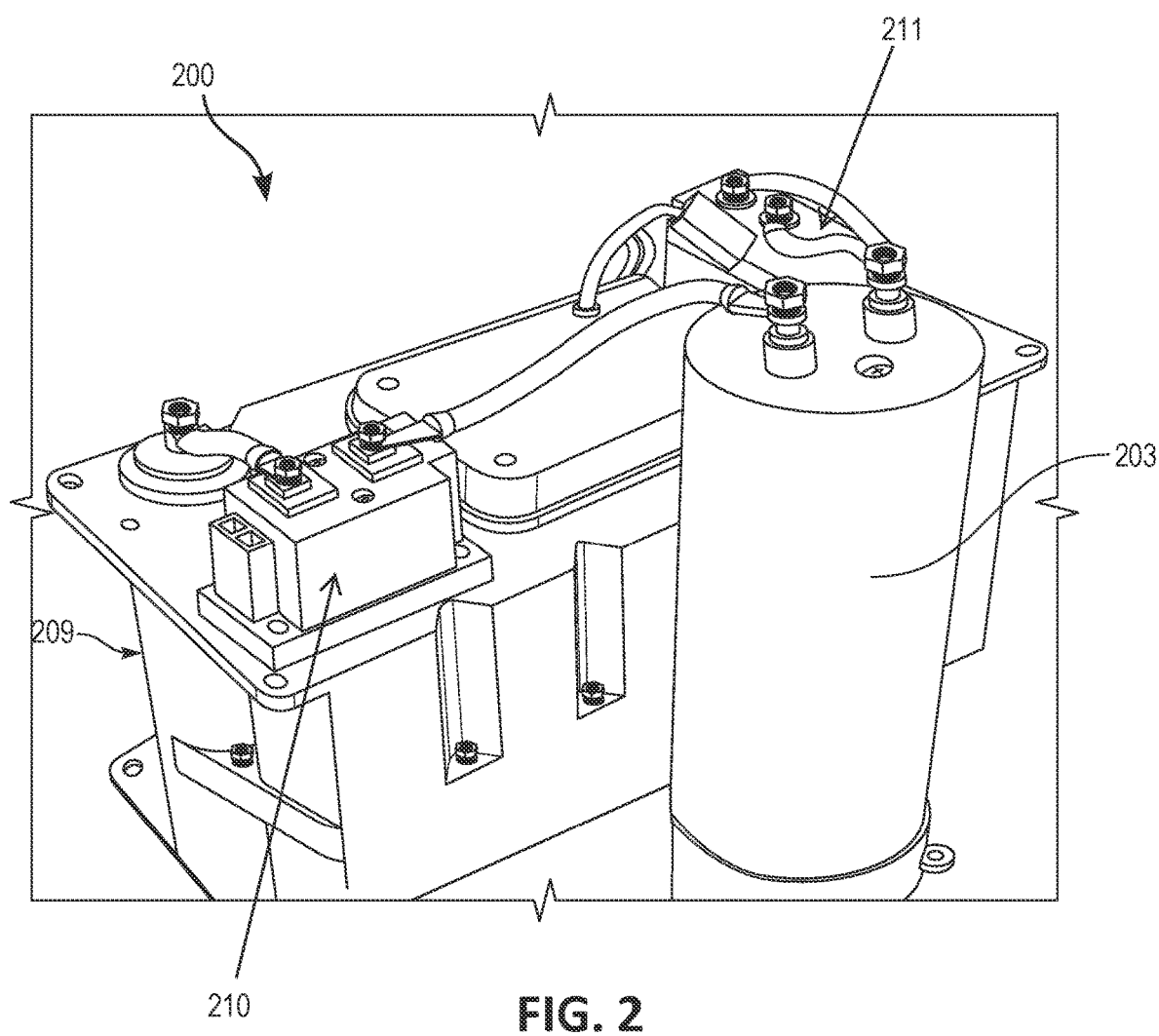
FIG. 2 illustrates an example embodiment of a system for providing and storing energy.

FIG. 2 illustrates an example embodiment of an energy system 200 for providing and storing energy. As shown, the energy system 200 includes an ultracapacitor 203, a battery 209, and one or more diodes (e.g., diodes 210, 211). The energy system 200 may include one or more structural and/or operational features similar to those shown and discussed with reference to any of the other example embodiments described herein.

In this example, the ultracapacitor 203 is electrically coupled to the battery 209 via electrical wiring or cabling. For example, the wiring or cabling is connected to the terminals of the ultracapacitor 203 (e.g., positive, negative) as well as to the terminals (e.g., positive, negative) of the battery 209 via.

The ultracapacitor 203 is electrically coupled to the battery 209 via diodes 210, 211. For example, the terminals of the diode are electrically coupled (e.g., via wiring or cabling) to the terminals of the ultracapacitor 203 and the terminals of the battery 209. The diodes 210, 211 may be electrically biased toward the battery 209 to allow energy to transfer from the ultracapacitor 203 to the battery 209. In some embodiments, the energy system 200 may only include a single diode. In some embodiments, the energy system 200 may not include any diodes. In some embodiments, the energy system 200 may include more than two diodes.

The ultracapacitor 203 can be configured to store energy (e.g., as a voltage). The battery 209 can be configured to store energy (e.g., as a voltage). The energy system 200 can be configured to allow energy to transfer from the ultracapacitor 203 to the battery 209. The diodes 210, 211 may facilitate the transfer of energy (e.g., current flow) from the ultracapacitor 203 to battery 209. The diodes 210, 211 may prevent a flow of energy from the battery 209 to the ultracapacitor 203.

Figure 3:
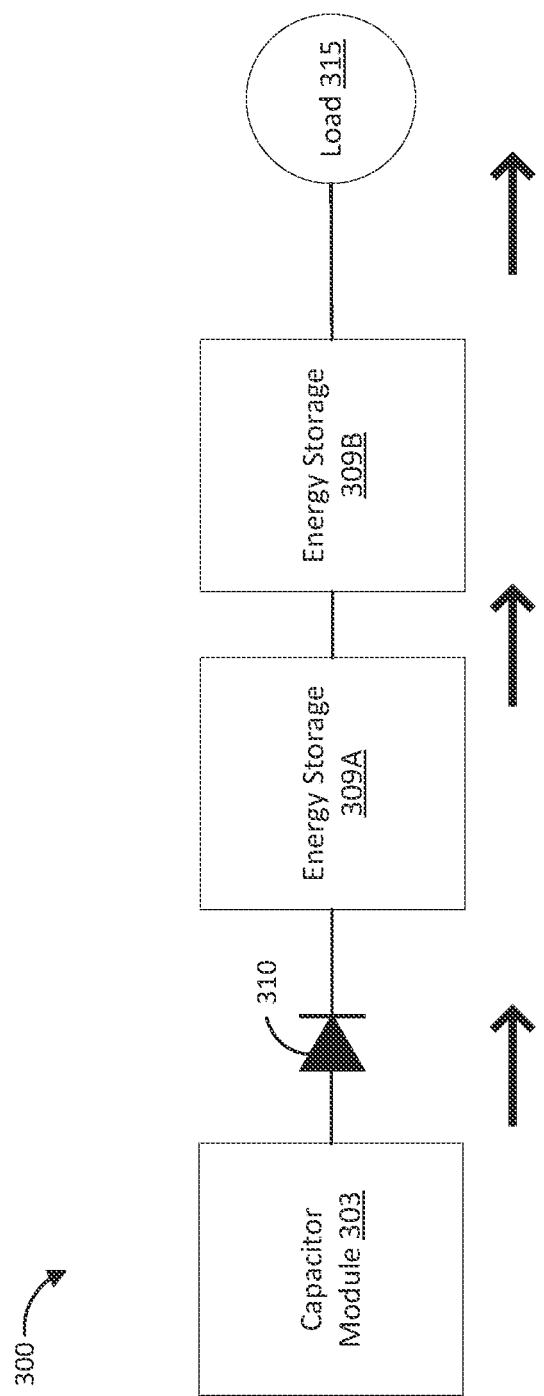
FIG. 3 is a block diagram illustrating an example embodiment of a system for providing and storing energy.

FIG. 3 is a block diagram illustrating an example embodiment of an energy system 300 for providing and storing energy. The example energy system 300 includes a capacitor module 303, a diode 310, an energy storage 309A, an energy storage 309B, and a load 315. The capacitor module 303 is electrically coupled with the energy storage 309A via the diode 310. The energy storage 309A is electrically coupled (e.g., series and/or parallel) with the energy storage 309B. The energy storage 309B is electrically coupled with the load 315. The energy storage 309B may provide energy to the load 315 to power an operation of the load 315. The components of energy system 300 may include similar structural and/or functional features as described with reference to any of the other example embodiments described herein.

The energy storage 309A may include structural and/or operational differences from energy storage 309B. For example, energy storage 309A and energy storage 309B each be configured to store a different amount of energy (e.g., voltage). As another example, energy storage 309A and energy storage 309B can each be configured with a different specific power (e.g., power density), specific energy (e.g., energy density), charge time, charging rate, life cycle, and/or internal resistance. As another example, energy storage 309A may be a different type of device or component than energy storage 309B. In some embodiments, energy storage 309A is a capacitor and energy storage 309B is a battery. In some embodiments, energy storage 309A is a first type of battery and energy storage 309B is a second type of battery. In some embodiments, energy storage 309A and energy storage 309B include various types of lithium ion batteries and/or lithium polymer batteries. In some embodiments, the energy storage 309A/309B include various materials for storing energy, such as zinc, carbon, magnesium, manganese, mercury, alkaline, silver, nickel, metal hydride, cadmium, lead, and the like.

In some embodiments, capacitor module 303 has a smaller specific energy than energy storage 309A or energy storage 309B. In some embodiments, energy storage 309A has a smaller specific energy than energy storage 309B. In some embodiments, capacitor module 303 has a greater specific power than energy storage 309A or energy storage 309B. In some embodiments, energy storage 309A has a greater specific power than energy storage 309B.

In one example implementation, the capacitor module 303 charges quickly (e.g., quicker than energy storages 309A, 309B) and stores the energy as an electric field. The capacitor module 303 then conveys energy to the energy storage 309A (which may charge quicker than energy storage 309B), and which stores the energy conveyed from the capacitor module 303. The energy storage 309A can convey energy to the energy storage energy storage 309B where energy is stored before being provided to the load 315.

Advantageously, the energy storage 309A may facilitate a transfer of energy from the capacitor module 303 to the energy storage energy storage 309B by providing an "intermediate" storage device that is more amenable to receiving energy from the capacitor module 303.

Figure 4:
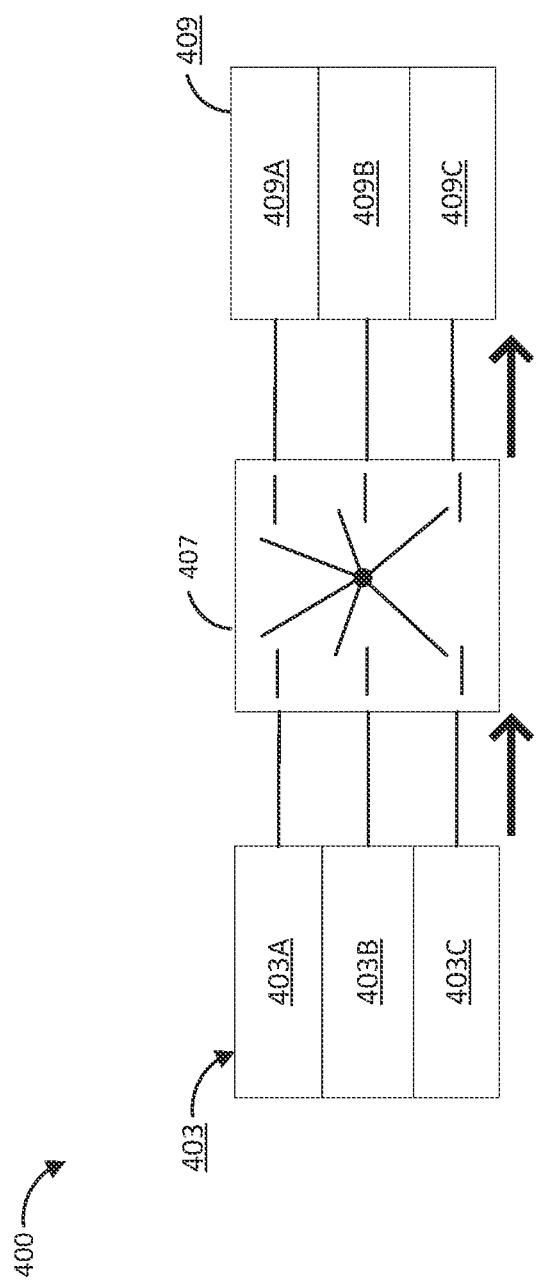
FIG. 4 is a block diagram illustrating an example embodiment of a switch for controlling an energy flow in an energy system.

FIG. 4 is a block diagram illustrating an example embodiment of a switch for controlling an energy flow in an energy system 400. The energy system 400 include capacitors (e.g., capacitors 404A, 404B, 404C), a switch 407, and batteries 409 (e.g., batteries 409A, 409B, 409C). The energy system 400, or various components thereof, can include structural and/or operational features similar to those described with reference to any of the other example embodiments described herein.

The switch 407 can control a flow of energy between the capacitors 403 and the batteries 409. The switch 407 can include switches, levers, relays, actuators, or the like for modulating a flow of energy (e.g., current or amperage). The switch 407 can operate according to various states in each of which an energy may flow differently through the switch 407. The switch 407 can transition between states. The switch 407 can transition between states automatically and/or or in response to a user input.

The switch 407 can operate in an open state in which the switch 407 does not allow energy to pass. For example, in an open state, the switch 407 may prevent an electrical connection from occurring between any of the capacitors 403 and any of the batteries 409.

The switch 407 can operate in a closed state in which the switch 407 electrically connects one or more of the capacitors 403 with one or more of the batteries 409 to allow an energy to pass from the capacitors 403 to the batteries 409. A variety of closed state configurations can exist. For example, the switch 407 can electrically connect one of the capacitors 403 to one of the batteries 409. As another example, the switch 407 can electrically connect a plurality of the capacitors 403 with one of the batteries 409. As another example, the switch 407 can electrically connect one of the capacitors 403 with a plurality of the batteries 409. As another example, the switch 407 can electrically connect one capacitor (e.g., 403A) with one of the batteries (e.g., 409A) while connecting another of the capacitors (e.g., 403B) with another of the batteries (e.g., 409B).

In some embodiments, the energy system 400 can include a plurality of switches. For example, a unique switch may electrically connect one of the one or more capacitors 403 to one of the one or more batteries 409.

Figure 5:
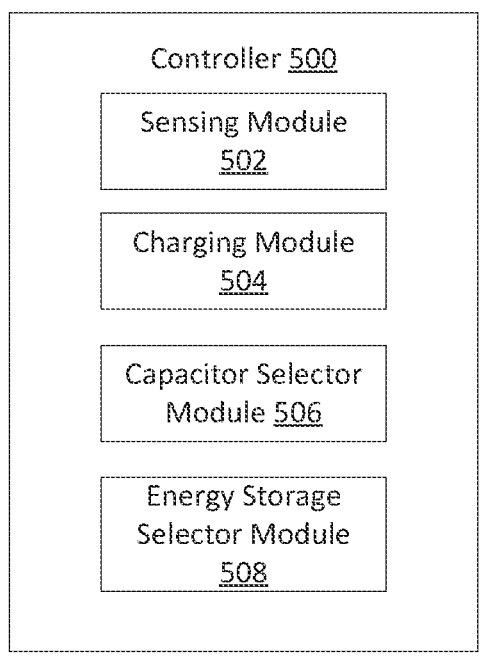
FIG. 5 is a block diagram illustrating an example controller of an energy system.

FIG. 5 is a block diagram illustrating an example controller 500 of an energy system. The controller 500 can include instructions (e.g., software instructions) that when executed (e.g., by a hardware processor) perform one or more operations. The controller 500 can include structural and/or operational features similar to controller 105 described with reference to FIG. 1. The controller 500 can include a sensing module 502, a charging module 504, a capacitor selector module 506, and an energy storage selector module 508.

The controller 500 may communicate with other components of an energy storage system (such as a switch) via a wired and/or wireless connection. In some embodiments, the controller 500 may be implemented in a same or similar physical location as one or more other components of an energy system such as a capacitor module or energy storage module. In some embodiments, the controller 500 may be implemented remote to one or more other components of an energy system. In some embodiments, the controller 500, or various modules thereof, may communicate with components of an energy system over a wireless network to monitor and/or control operations of the energy system. In some embodiments, the controller 500, or various modules thereof, may communicate with one or more users. For example, the controller 500 may issue various notifications to a user (e.g., via a wireless device such as to a phone or computer) relating to operations of the controller 500 and/or the energy system such as a charge status of an energy storage device (e.g., battery field), a remaining operating time of the energy storage device, a geographic location of the user, and/or a geographic destination of the user. In some embodiments, the controller 500 may be implemented with a billing system that charges a user or subscriber for performing certain operations (e.g., charging).

In general, the sensing module 502 is configured to receive information from sensor such as voltage sensors, current sensors, or the like. The sensor information may pertain to any part and/or components of an energy system such as a capacitor module, an energy storage device, a load, etc. The sensing module 502 may be configured to track a history of voltages, current, or the like. The sensing module 502 may be configured to predict future voltages, currents, or the like, such as based on trends of historical data.

In general, the charging module 504 is configured to determine when to transfer energy from a capacitor module to an energy storage device such as to charge the energy storage device or to provide voltage support thereto. The charging module 504 can also be configured to determine when a charge is complete and to stop transferring energy from a capacitor module to an energy storage device. The charging module 504 may control an operation of a switch. For example, the charging module 504 may control transitions between various states of a switch to control how and when energy flows in an energy system. In some embodiments, the charging module 504 can use the information from the sensing module 502 to determine when the charge or stop charging an energy storage device and/or how to transition a switch between various states.

In some embodiments, the charging module 504 can control the operation of a switch (e.g., transitions between states) based on any number of criteria and/or conditions. For example, the charging module 504 can control the switch based on battery voltage, capacitor voltage, battery amperage (e.g., delivered to a load), capacitor amperage (e.g., receive from an energy source), or the like. In some embodiments, the charging module 504 can control a switch operation based on levels, changes, rates of change, and/or changes in rate of change, etc. of any of the preceding examples. In some embodiments, the charging module 504 can control a switch operation based on present values and/or historical values.

In one example embodiment, the charging module 504 may be implemented remote to components of an energy system and may control operations of the energy system relating to charging over a network. For example, the charging module 504 may monitor (e.g., in real-time) the charge status of an energy storage device (e.g., battery field). The charging module 504 may control a transfer of energy (such as timing and/or amount) to the energy storage device. In some embodiments, the controller 504 may control charging automatically. In some embodiments, the controller 504 may control charging in response to a user request. For example, the charging module 504 may issue a notification to a user regarding a charge status (e.g., that the charge is low) and/or other information such as relating to a geographic location of a user (e.g., a user is a certain number of miles from a destination). The user may communicate a request to the charging module 504 to charge the energy storage device. In some embodiments, the charging module 504 may charge the user for performing a charging operation or other operations. In some embodiments, the charging module 504 may perform certain operations without charging the user.

In general, the capacitor selector module 506 is configured to select which of a plurality of capacitors are to be used to convey energy to charge an energy storage device. The capacitor selector module 506 may control an operation of a switch such as which capacitor the switch electrically connects to a battery. The capacitor selector module 506 can include similar operational features as described with reference to charging module 504 such as controlling a switch operation based on the example information, criteria, and/or conditions described. In some embodiments, the capacitor selector module 506 can compare voltages of various capacitors to determine which capacitors to use to charge an energy storage device (e.g., which capacitor has the highest voltage).

In general, the energy storage selector module 508 is configured to select which of a plurality of energy storage devices are to be used to receive energy to be charged. The energy storage selector module 508 may control an operation of a switch such as which battery the switch electrically connects to a capacitor. The energy storage selector module 508 can include similar operational features as described with reference to charging module 504 such as controlling a switch operation based on the example information, criteria, and/or conditions described.

In some embodiments, the controller 500 can be configured with various operational settings. In some embodiments, the controller 500 can be provisioned (e.g., over-the-air) with operational settings. In some embodiments, the operational settings of the controller 500 can be periodically updated, such as by requesting and/or receiving software updates over-the-air. In some embodiments, the controller 500 can be configured with operational settings according to other components (e.g., capacitors, batteries) with which the controller 500 operates in a system. For example, the controller 500 can be configured with settings such as maximum, minimum, or threshold voltages or amperages or other operational ratings of the devices in the system.

Example Processes

Figure 6A:
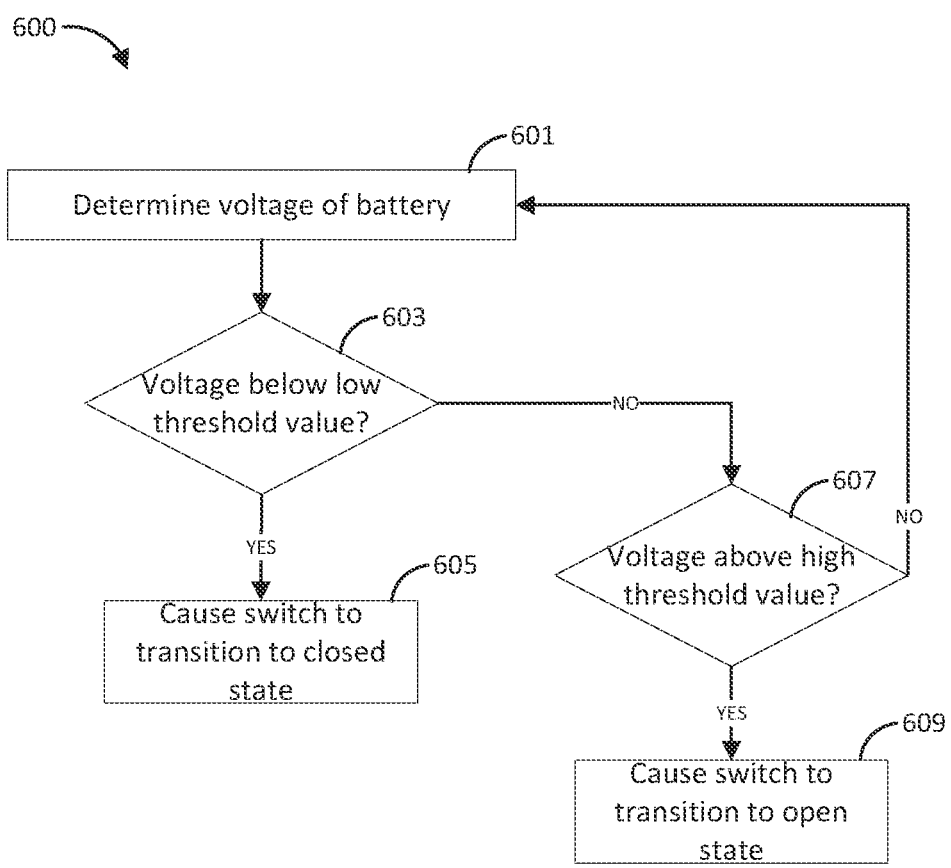
FIGS. 6A-6B are flowcharts illustrating example processes for controlling an operation of a switch to control an energy flow in an energy system.

FIG. 6A is a flowchart illustrating an example process 600 for controlling an operation of a switch to control an energy flow in a system. The example, process 600, or portions thereof, can be performed by a controller such as controller 500 and/or controller 105 described herein.

At block 601, a controller can determine a voltage of a battery. The voltage can be a voltage level, a voltage change, a voltage rate of change, and/or a voltage change in rate of change. In some embodiments, the voltage may include present values and/or historical values.

At block 603, the controller can determine whether the battery voltage is below a low threshold value. The low threshold value may be based on operational settings or ratings of the battery. The low threshold value may be dynamically adjusted such as by a user. If the battery voltage is below the low threshold value, the controller continues to block 605, otherwise the controller proceeds to block 607.

At block 605, the controller causes the switch to transition to a closed state. The closed state can allow energy to pass to the battery (e.g., from a capacitor) to charge the battery. The closed state can include any of the closed states discussed herein such as with reference to FIG. 4.

At block 607, the controller can determine whether the battery voltage is above a high threshold value. The high threshold value may be different than the low threshold value discussed at block 603. The high threshold value may be greater than the low threshold value. The high threshold value may be based on operational settings or ratings of the battery. The high threshold value may be dynamically adjusted such as by a user. If the battery voltage is above the high threshold value, the controller continues to block 609, otherwise the controller proceeds to block 601.

At block 609, the controller causes the switch to transition to an open state. The open state may prevent energy from passing to the battery (e.g., from a capacitor).

Process 600 is provided as an example and is not intended to be limiting. In some embodiments, the controller may be configured to perform similar operations with respect to current or amperages (e.g., going from a battery to a load).

Figure 6B:
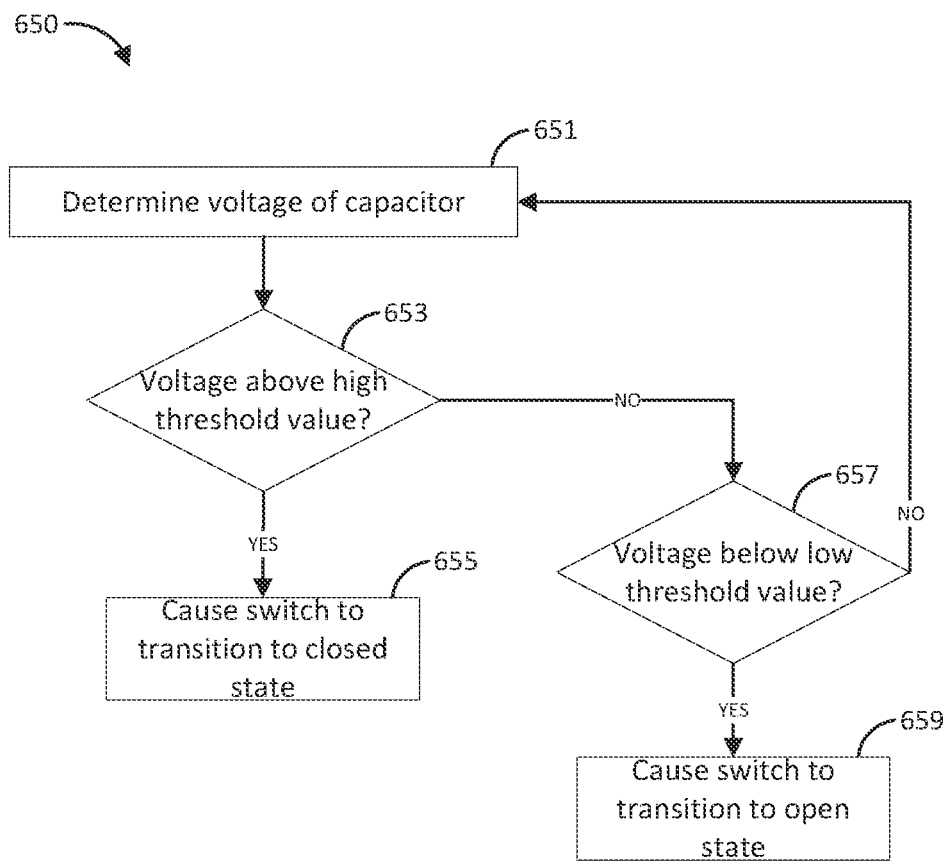

FIG. 6B is a flowchart illustrating an example process 650 for controlling operation of a switch to control an energy flow in a system. The example, process 650, or portions thereof, can be performed by a controller such as controller 500 and/or controller 105 described herein.

At block 651, a controller can determine a voltage of a capacitor. The voltage can be a voltage level, a voltage change, a voltage rate of change, and/or a voltage change in rate of change. In some embodiments, the voltage may include present values and/or historical values.

At block 653, the controller can determine whether the capacitor voltage is above a high threshold value. The high threshold value may be based on operational settings or ratings of the capacitor. The high threshold value may be dynamically adjusted such as by a user. If the capacitor voltage is above the high threshold value, the controller continues to block 655, otherwise the controller proceeds to block 657.

At block 655, the controller causes the switch to transition to a closed state. The closed state can allow energy to pass from the capacitor (e.g., to a battery) to charge the battery. The closed state can include any of the closed states discussed herein such as with reference to FIG. 4.

At block 657, the controller can determine whether the capacitor voltage is below a low threshold value. The low threshold value may be different than the high threshold value discussed at block 653. The low threshold value may be less than the high threshold value. The low threshold value may be based on operational settings or ratings of the capacitor. The low threshold value may be dynamically adjusted such as by a user. If the capacitor voltage is below the low threshold value, the controller continues to block 659, otherwise the controller proceeds to block 651.

At block 659, the controller causes the switch to transition to an open state. The open state may prevent energy from passing from the capacitor (e.g., to a battery).

Process 650 is provided as an example and is not intended to be limiting. In some embodiments, the controller may be configured to perform similar operations with respect to current or amperages (e.g., going to a capacitor from an energy source).

Example Implementations

Figure 7A:
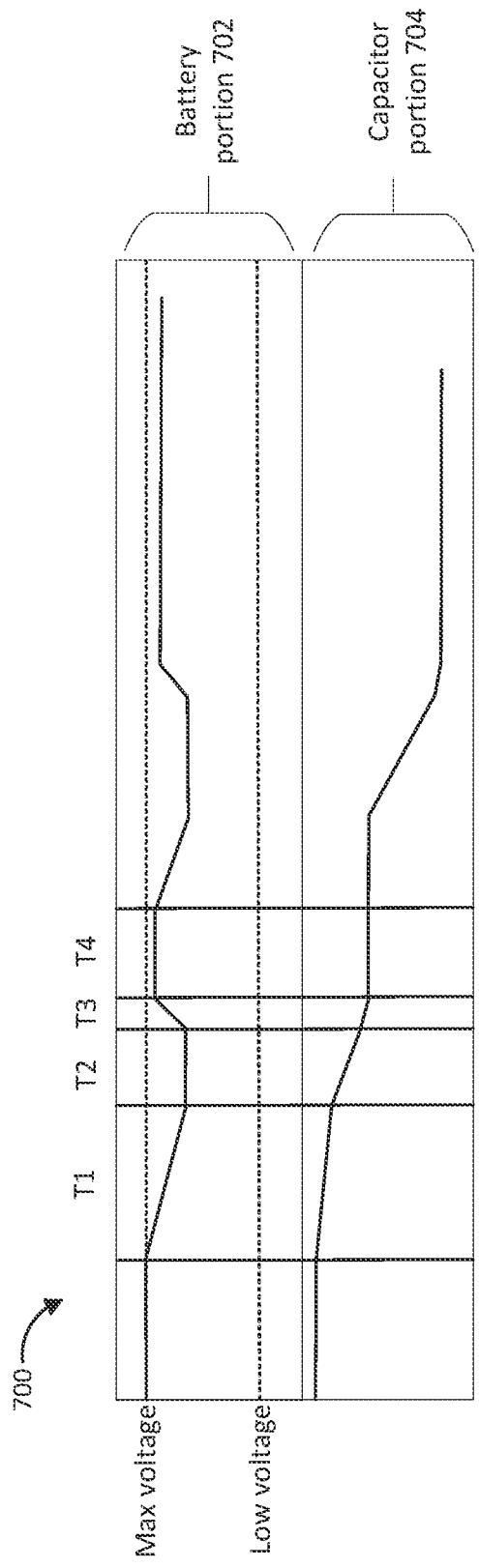

FIG. 7A is a diagram illustrating an example implementation of an energy system. The chart 700 represents a voltage level during a length of time of various components of an energy system such as a capacitor (e.g., ultracapacitor) and a battery. Although ultracapacitors and batteries are discussed in this example, any types of energy devices are contemplated, such as any of the examples discussed elsewhere herein. The chart 700 includes a battery portion 702 and a capacitor portion 704. The battery portion 702 displays the voltage levels of a battery during a length of time and the capacitor portion 704 displays the voltage levels of a capacitor during that same length of time. The battery portion 702 and the capacitor portion 704 may not be drawn to scale. The battery portion 702 and the capacitor portion 704 may be represented using different voltage scales and/or different voltage ranges. As discussed in any of the examples provided herein, the capacitor and the battery may be electrically connected such that the capacitor can be configured to transfer energy to the battery to charge the battery and/or to provide voltage support to the battery, such as when the battery falls below a certain voltage threshold and/or when a load is demanding a large energy (e.g., drawing a large current) from the battery.

The scale of voltages shown in chart 700 could be on the order of volts, tens of volts, or hundreds of volts. For example, the battery may be configured to store about 400 volts and the ultracapacitor may be configured to store about 400 volts. The scale of voltage and/or range of voltage of the capacitor portion 704 may differ from the scale and/or range of voltage of the battery portion 702. The scale of time shown in chart 700 could be on the order of milliseconds, centiseconds, deciseconds, seconds, tens of seconds, minutes, hours, etc.

As will be discussed with reference to the chart 700, the capacitor (e.g., ultracapacitor) can provide voltage support to the battery to maintain, increase, and/or prevent decrease of a voltage level in the battery. In one non-limiting example implementation, an ultracapacitor may provide voltage support to a battery in a vehicle such as an electric vehicle. The ultracapacitor can be electrically coupled to the battery to provide voltage support thereto. The ultracapacitor and battery may both begin at a same or similar voltage level (e.g., 56 volts). The vehicle may demand energy from the battery and will accordingly draw a current therefrom and the battery voltage may decrease such as to about 51-52 volts. In response to the decrease in battery voltage, the ultracapacitor may replace the voltage level consumed in the battery resulting from the current draw from the vehicle. Moreover, in some embodiments, energy consumed at the battery may be immediately replaced (or prevented) by voltage support provided from the ultracapacitor. This voltage exchange may continue for a prolonged duration and may improve vehicle range and operation. As another example, due to the voltage exchange and support provided to the battery from the ultracapacitor, the vehicle may consume only a small amount of energy from the battery (e.g., 1.5 or 2.0 volts) over an extended range of operation such as 30-40 miles which may provide a significant advantage over standard operating energy systems which may consume about 8-10 volts through a typical current draw over a similar range of operation.

Examples will now be provided with reference to chart 700. During T1, a voltage in the battery is being depleted. The voltage in the battery may be depleted as a result of an energy demand from a load. During T1, a voltage in the ultracapacitor may be depleted as a result of energy being transferred from the ultracapacitor to the battery. Energy transferred from the ultracapacitor to the battery, can slow the rate of energy being drawn from the battery to reduce the rate the battery voltage is depleted.

Energy conveyed from the ultracapacitor to the battery can result from a voltage differential between the ultracapacitor and the battery exceeding a threshold. For example, as the voltage in the battery is depleted, the voltage differential between the battery and the ultracapacitor may increase such that energy may become more amenable to flow (e.g., current flow) from the ultracapacitor (e.g., to the battery). In some embodiments, the threshold voltage differential between the battery and the ultracapacitor may result from a resistance between the battery and the ultracapacitor, such as a resistance in the wiring or cabling between the ultracapacitor and the battery, and/or a resistance in a diode between the ultracapacitor and the battery. In some embodiments, the threshold voltage differential between the ultracapacitor and the battery may be due, at least in part, to a threshold forward voltage barrier in a diode required for the diode to "open" to allow current to pass therethrough. For example, until a voltage differential between the ultracapacitor and the battery exceeds the threshold forward voltage barrier in the diode, the diode will be "closed" and will not conduct an electrical current therethrough.

In some embodiments, the amount of energy or rate of energy transferred from the ultracapacitor to the battery depends on a voltage differential between the battery and the ultracapacitor. For example, a greater voltage differential would result in a greater amount of energy transferred and/or a faster rate of energy transferred from the ultracapacitor. In some embodiments, the amount of energy or rate of energy transferred from the ultracapacitor to the battery depends on an energy requirement demanded by the load. For example, a large energy load requirement would result in a greater amount of energy transferred and/or a faster rate of energy transferred from the ultracapacitor.

At T2, the voltage in the ultracapacitor decreases (e.g., at a faster rate than T1), which may result from energy being conveyed from the ultracapacitor to the battery as a result of a voltage differential between the two exceeding a threshold.

During T2, the load may be demanding a large amount of energy. For example, in some embodiments, the load may be a vehicle. The vehicle may demand more energy during certain moments of operation, such as during acceleration, when travelling uphill, when starting the engine, and the like. During T2, as the load demands large amounts of energy (e.g., draws a large current from the battery such as 200 or 300 amperes), the voltage in the battery would ordinarily decrease. However, due to the electrical coupling between the battery and the ultracapacitor, the ultracapacitor provides voltage support to the battery to prevent the battery voltage from dropping below a threshold value. For example, as shown during T2, when the energy requirements at the load are high, the voltage at the battery remains constant and the voltage at the ultracapacitor decreases.

In some embodiments, the ultracapacitor may provide energy to the battery as the battery conveys energy to the load such that the battery voltage remains substantially constant as energy is passed from the ultracapacitor to the battery to "replace" energy being passed from the battery to the load. In some embodiments, the ultracapacitor may provide energy to the load such that the load draws energy from the ultracapacitor (e.g., directly) rather than from the battery such that the battery voltage remains substantially constant while the ultracapacitor voltage is being depleted. In some embodiments, the ultracapacitor may provide energy to the load and to the battery (e.g., simultaneously).

Advantageously, the ultracapacitor can be configured to quickly discharge energy (e.g., nearly immediately discharge energy stored as an electric field), such as to the battery, at any moment a voltage differential between the ultracapacitor and the battery exceeds a threshold. Advantageously, the quick discharges of energy from the ultracapacitor can provide voltage support to the battery to stabilize and energy in the battery such as preventing a voltage in the battery from dropping below a threshold.

Advantageously, providing voltage support to the battery such as at times when the load is demanding large amount of energy (e.g., during T2), can prevent an energy in the battery, such as a voltage, from being depleted below a low threshold. This can prevent hazardous conditions such as fires, explosions, overheating, etc. that can result when a battery's energy is over depleted. For example, in the example chart 700, the battery voltage may never approach the low voltage threshold because it receives voltage support from the ultracapacitor, as discussed. The low voltage threshold shown in chart 700 can represent a voltage at which the risk for hazardous conditions is high.

Advantageously, providing voltage support to the battery to prevent its voltage from dropping below a certain threshold reduces the number of charge-discharge cycles. This can prolong the batteries life by reducing the deterioration of the battery that occurs with each charge-discharge cycle.

Advantageously, a self-discharge of the ultracapacitor can be significantly reduced and/or eliminated due to the resistance created by the voltage in the battery preventing a current from flowing from the ultracapacitor except to the battery to provide voltage support thereto as discussed herein.

During T3, a voltage in the battery increases and a voltage in the ultracapacitor decreases. This may result from an energy being transferred from the ultracapacitor to the battery. As shown, in some embodiments, the ultracapacitor can be configured to charge the battery.

During T4, the voltage in the battery may be at a maximum voltage that the battery is configured to retain. The voltage of the battery may remain substantially constant, due in part to the load not drawing any energy from the battery. The voltage of the ultracapacitor may remain substantially constant due to no energy being conveyed from the ultracapacitor to the battery.

In some embodiments, the ultracapacitor may not convey energy to the battery because a voltage differential between the ultracapacitor and the battery may not exceed a threshold. In some embodiments, the ultracapacitor may not convey energy to the battery because the voltage in the battery is not being depleted. In some embodiments, the ultracapacitor may not convey energy to the battery because the load is not drawing energy from the battery.

Figure 7B:
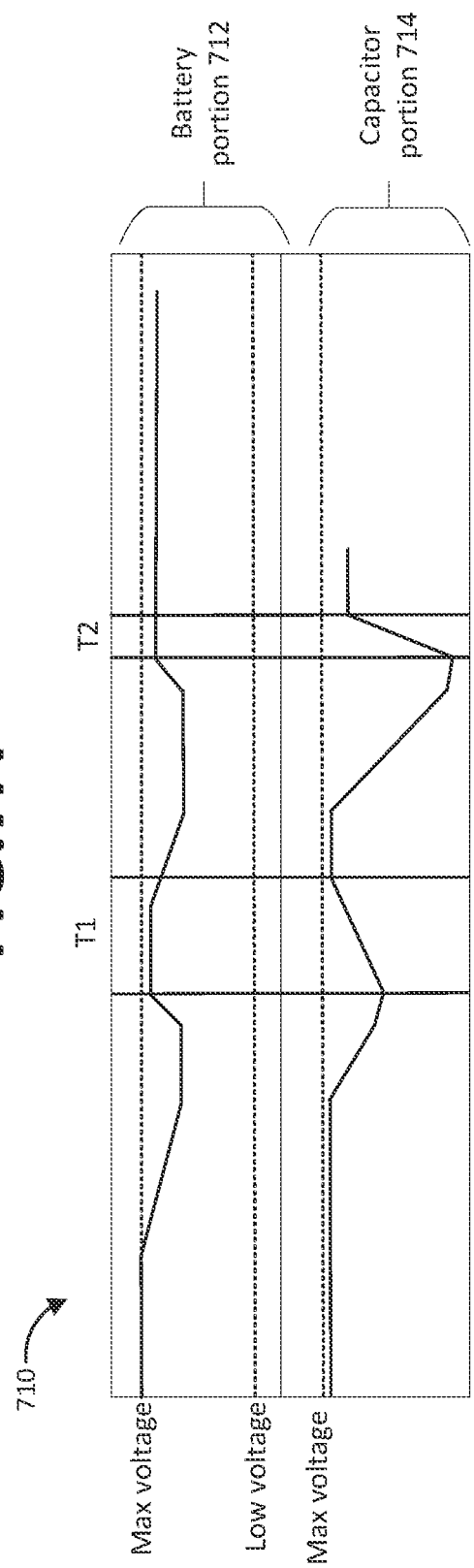

FIG. 7B is a diagram illustrating an example implementation of an energy system. The chart 710 includes similar markings, layout, axes, scales, etc. as chart 700 discussed with reference to FIG. 7A. In this example, the ultracapacitor is electrically coupled to an energy source during operation of the system such as when the load is demanding energy. The energy source can provide energy to the ultracapacitor to charge the ultracapacitor. The energy source can be an energy generation or regeneration system. For example, the energy source can be a generator. In some embodiments, the energy source can be an energy generation system on-board a vehicle and configured to generate energy based on a motion or movement of the vehicle. An example of an on-board energy generation system is shown and discussed, for example, at least with reference to FIGS. 9 and 10 and corresponding paragraphs of U.S. patent application Ser. No. 17/332,088 which is hereby incorporated by reference in its entirety for all purposes.

During T1, the energy source provides energy to the ultracapacitor to charge the ultracapacitor. As shown during T1, the ultracapacitor voltage increases. Similarly, during T2, the energy source provide energy to the ultracapacitor to charge the ultracapacitor. The rate at which the ultracapacitor is charged (e.g., increases in voltage) may depend on a rate at which the energy source is generating energy. For example, when the energy source is generating large amounts of energy and/or at a fast rate, the ultracapacitor may charge quicker, such as during T2, than at other times, such as during T1.

Advantageously, the energy source can maintain a high voltage level in the ultracapacitor. The high voltage level in the ultracapacitor can result in a large voltage differential between the ultracapacitor and the battery (e.g., larger than if the ultracapacitor were not recharged by the energy source). Advantageously, a large voltage differential may facilitate the flow of energy from the ultracapacitor to the battery to provide voltage support to the battery. Advantageously, maintaining a high voltage in the ultracapacitor by charging the ultracapacitor with the energy source can facilitate providing voltage support to the battery to maintain a high voltage in the battery, and may reduce the risk that the battery voltage drops below a threshold voltage (e.g., increasing risk of fires, explosions, etc.).

FIG. 7C is a diagram illustrating an example implementation of an energy system. The chart 720 includes similar markings, layout, axes, scales, etc. as chart 700 discussed with reference to FIG. 7A. In this example, the ultracapacitor is electrically coupled to the battery via a switch. The switch can be configured with similar structural and/or operational features as discussed in any of the examples provided herein. For example, the switch can operate in a close state or in an open state. As another example, the switch can transition between states as a result of a user input and/or automatically according to instructions from a controller based on various conditions.

During T1, the ultracapacitor can be connected to an energy source such that the ultracapacitor increases in voltage. In some embodiments, the energy source may be a power grid or Mains electricity. In some embodiments, the ultracapacitor can be electrically connected to the energy source (e.g., power grid) via a standard 110 volt outlet and plug. In some embodiments, the ultracapacitor can be electrically connected to the power grid during a power blackout during which time the energy may not be produced and input into the power grid. Advantageously, the ultracapacitor may increase in charge as a result of transient energy contained in the power grid during the power outage, as discussed herein.

During T1, the battery begins to decrease in voltage. This can occur as a result of an energy being demanded from a load. For example, during a power blackout, a battery may be used to operate household appliances when the household appliances cannot draw sufficient energy from the power grid to sustain their operation.

At the beginning of T2, the battery reaches a threshold voltage. In some embodiments, the threshold voltage may represent voltage at which the battery is unable to provide sufficient energy to the load to power the load to allow for continued operation. In some embodiments, the threshold voltage may represent a voltage beneath which it may be desirable to prevent the battery from reaching to reduce a risk of fires, explosion, etc. resulting from overuse of the battery.

At T2, the voltage in the batter increases. This can result from energy flowing from the ultracapacitor to the battery. Energy may flow from the ultracapacitor to the battery in response to a switch operating in a closed state during which the switch electrically connects the ultracapacitor and the battery to allow a current to pass therebetween. The switch can transition to the closed state in response to a user input. For example, in embodiments where the threshold voltage represents an inoperable state, a user may see that the battery is drained of charge because the load has discontinued operation. The user can close the switch (e.g., via a mechanical or electrical actuator or the like), to cause energy in the ultracapacitor to flow to the battery to charge the battery such that the load can continue to operate. Advantageously, the examples and embodiments discussed can allow loads (e.g., appliances) to continue to operate for prolonged periods of time such as during power outages.

At the beginning of T3, the switch is transitioned to the open state to prevent energy from passing from the ultracapacitor to the battery. Advantageously, the open state may allow the ultracapacitor to charge such as during times of limited energy source such as during a power outage. During T3, the battery decreases in voltage as a result of an energy demand at the load. During T3, the ultracapacitor maintains a substantially constant voltage. For example, their may be insufficient residual transient energy in the power grid to charge the ultracapacitor and/or the ultracapacitor may have been disconnected from the power grid.

At the beginning of T4, the switch is closed to allow the ultracapacitor to charge the battery. As a result, the battery voltage increases and the ultracapacitor voltage decreases.

FIG. 7D is a diagram illustrating an example implementation of an energy system. The chart 730 includes similar markings, layout, axes, scales, etc. as chart 700 discussed with reference to FIG. 7A. In this example, the ultracapacitor is electrically coupled to the battery via a switch. The switch can be configured with similar structural and/or operational features as discussed in any of the examples provided herein. For example, the switch can operate in a close state or in an open state. As another example, the switch can transition between states as a result of a user input and/or automatically according to instructions from a controller based on various conditions.

During T1, the ultracapacitor can be connected to an energy source such that the ultracapacitor increases in voltage. In some embodiments, the energy source may be a power grid or Mains electricity, such as during a power outage, for example, as discussed with reference to FIG. 7C. In some embodiments, the energy source can be a power generation or regeneration system, such as a generator.

During T1, the battery begins to decrease in voltage. This can occur as a result of an energy being demanded from a load.

At the beginning of T2, the switch may transition to a closed state to allow energy to pass from the ultracapacitor to the battery. In some embodiments, the switch may transition to the closed state in response to a user input. In some embodiments, the switch may transition to the closed state in response to a signal from a controller. For example, the controller can cause the switch to transition between states based on a variety of conditions. In this example, the controller causes the switch to transition to the closed state in response to the battery voltage reaching the low voltage threshold, as determined by a voltage sensor.

During T2, while the switch is closed, the battery voltage increases and the ultracapacitor voltage decreases as the ultracapacitor charges the battery.

At the beginning of T3, the switch transitions to an open state to prevent energy from flowing from the ultracapacitor to the battery. A controller causes the switch to transition in response to determining that the voltage of the ultracapacitor reaches the low voltage threshold, as based on signals received from a voltage sensor.

During T3, while the switch is open, the ultracapacitor charges as it receives energy from the energy source and the battery voltage decreases as it supplies energy to the load.

At the beginning of T4, the controller causes the switch to close in response to determining, based on signals from a voltage sensor, that the ultracapacitor voltage has reached the high voltage threshold. During T4, energy flows from the ultracapacitor to the battery to charge the battery.

At the beginning of T5, the controller causes the switch to open in response to determining that the battery voltage has reached a high threshold. During T5, the battery voltage is depleted as the battery powers the load, and the ultracapacitor voltage increases as the ultracapacitor receives energy from the energy source.

Advantageously, a switch that transitions between states (e.g., automatically in response to conditions determined by a controller) allows for optimal performance by allowing energy to pass from the ultracapacitor to the battery at critical times (e.g., when the battery voltage is low and/or when the ultracapacitor voltage is high) and by preventing energy from passing from the ultracapacitor to the battery (e.g., when the ultracapacitor voltage is low and/or when the battery voltage is high). Advantageously, the switch may only transition between states as needed thus preventing unnecessary energy loss and/or preserving energy to be supplied at critical times of energy demand.

Additional Embodiments

As used herein, "real-time" or "substantial real-time" may refer to events (e.g., receiving, processing, transmitting, displaying etc.) that occur at the same time or substantially the same time (e.g., neglecting any small delays such as those that are imperceptible to humans such as delays arising from electrical conduction or transmission). As a non-limiting example, "real-time" may refer to events that occur within a time frame of each other that is on the order of milliseconds, seconds, tens of seconds, or minutes. In some embodiments, "real-time" may refer to events that occur at a same time as, or during, another event.

As used herein, "system," "instrument," "apparatus," and "device" generally encompass both the hardware (for example, mechanical and electronic) and, in some implementations, associated software (for example, specialized computer programs for graphics control) components.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Each of the processes, methods, and algorithms described in the preceding sections may be embodied in, and fully or partially automated by, code modules executed by one or more computer systems or computer processors including computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described herein generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various features and processes described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the herein-described embodiments, the elements of which are to be understood as being among other acceptable examples. All such modifications and variations are intended to be included herein within the scope of this disclosure. The section headings used herein are merely provided to enhance readability and are not intended to limit the scope of the embodiments disclosed in a particular section to the features or elements disclosed in that section. The foregoing description details certain embodiments. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

What is claimed is:

1. A system for managing energy storage, the system comprising:
    an ultracapacitor configured to:
        electrically couple to a power grid via a diode to receive a first energy from the power grid, wherein the diode is biased toward the ultracapacitor;
        receive the first energy from the power grid during a power outage, wherein the first energy includes a residual transient energy; and
        store the first energy as an electric field of the ultracapacitor;
    a battery configured to electrically couple to the ultracapacitor and configured to receive energy therefrom to store as an energy of the battery;
    one or more switches configured to:
        operate in an open state or a closed state;
        electrically couple the battery to the ultracapacitor when in the closed state to conduct an energy between the ultracapacitor and the battery; and
        electrically disconnect the battery from the ultracapacitor when in the open state to prevent conducting an energy between the ultracapacitor and the battery; and
    a controller in electrical communication with the one or more switches and configured to:
        generate a notification to a mobile computing device of a user, the notification comprising information relating to a charge status of the battery and a remaining operating time of the battery;
        receive a user request from the user responsive to the notification, said user request relating to charging the battery;
        cause the one or more switches to transition between the open state and the closed state based on at least the user request;
        generate a billing charge to the user based on at least causing the one or more switches to transition between the open state and the closed state;
        maintain a log of historical data relating to an operation of the system; and
        analyze one or more trends of the historical data to predict a future operation of the system.

2. The system of claim 1, further comprising a voltage sensor in electrical communication with the ultracapacitor or the battery and configured to detect a voltage level of the ultracapacitor or the battery.

3. The system of claim 2, wherein the controller is in electrical communication with the voltage sensor and configured to:
    cause the one or more switches to transition to the closed state, in response to determining that the voltage level in the battery is below a low threshold level; and
    cause the one or more switches to transition to the open state, in response to determining that the voltage level in the battery is above a high threshold level.

4. The system of claim 3, wherein the controller is further configured to dynamically adjust the low threshold level based on a user input.

5. The system of claim 3, wherein the controller is further configured to dynamically adjust the high threshold level based on a user input.

6. The system of claim 2, wherein the controller is in electrical communication with the voltage sensor and configured to:
    cause the one or more switches to transition to the closed state, in response to determining that the voltage level in the ultracapacitor is above a high threshold level, and
    cause the one or more switches to transition to the open state, in response to determining that the voltage level in the ultracapacitor is below a low threshold level.

7. The system of claim 6, wherein the controller is further configured to dynamically adjust the high threshold level and the low threshold level based on a user input.

8. The system of claim 2, wherein the controller is in electrical communication with the voltage sensor and configured to cause the one or more switches to transition to the closed state, in response to determining that a voltage differential between the ultracapacitor and the battery is above a threshold level.

9. The system of claim 1, further comprising a current sensor in electrical communication with the battery and configured to detect a current or amperage conducted from the battery to a load.

10. The system of claim 9, wherein the controller is in communication with the current sensor and configured to cause the one or more switches to transition to the closed state when a current or amperage conducted from the battery to the load exceeds a threshold level.

11. The system of claim 1, further comprising a second ultracapacitor configured to store a second energy as an electric field of the second ultracapacitor,
    wherein the battery is configured to electrically couple to the second ultracapacitor and configured to receive energy therefrom,
    wherein the one or more switches comprises a plurality of switches configured to operate in the open state or the closed state or a second closed state or a third closed state,
    wherein, when in the closed state, the plurality of switches is further configured to electrically disconnect the battery from the second ultracapacitor to prevent conducting an energy between the second ultracapacitor and the battery,
    wherein, when in the second closed state, the plurality of switches is configured to:

electrically couple the battery to the second ultracapacitor to conduct an energy between the second ultracapacitor and battery; and electrically disconnect the battery from the ultracapacitor to prevent conducting an energy between the ultracapacitor and the battery, wherein, when in the third closed state, the plurality of switches is configured to electrically couple the battery to the ultracapacitor and to the second ultracapacitor to conduct an energy from the ultracapacitor and the second ultracapacitor to the battery.

12. The system of claim 11, wherein the controller is configured to cause the plurality of switches to transition between the open state, the closed state, the second closed state, or the third closed state based on voltage levels of the ultracapacitor and the second ultracapacitor.

13. The system of claim 1, wherein the controller is configured with settings including conditions for controlling an operation of the one or more switches, wherein the controller is configured to adjust the settings, according to specifications of the battery or the ultracapacitor, including voltage capacity.

14. The system of claim 1, wherein the battery is removably electrically coupled to the ultracapacitor via one or more wires configured to conduct 100 or more amperes across a 100 volt or more voltage differential.

15. The system of claim 1, wherein the controller is remote to the one or more switches and is configured to communicate wirelessly with the one or more switches.

16. The system of claim 1, wherein the ultracapacitor is further configured to removably electrically couple to the power grid via a standard outlet.

17. A method for managing energy storage, the method comprising:

electrically coupling an ultracapacitor to a power grid via a diode to receive a first energy from the power grid, wherein the diode is biased toward the ultracapacitor;

receiving, at the ultracapacitor, the first energy from the power grid during a power outage, wherein the first energy includes a residual transient energy;

storing the first energy as an electric field of the ultracapacitor; and under control of one or more processors:

generating a notification to a mobile computing device of a user, the notification comprising information relating to a charge status of a battery and a remaining operating time of the battery;

receiving a user request from the user responsive to the notification, said user request relating to charging the battery;

based on at least the user request, transitioning a one or more switches to a closed state to electrically couple the battery to the ultracapacitor to conduct an energy between the ultracapacitor and the battery;

transitioning the one or more switches to an open state to electrically disconnect the battery from the ultracapacitor to prevent conducting an energy between the ultracapacitor and the battery;

generating a billing charge to the user based on at least causing the one or more switches to transition between the open state and the closed state;

maintaining a log of historical data relating to an operation of the ultracapacitor or the battery; and analyzing one or more trends of the historical data to predict a future operation of the ultracapacitor or the battery.

18. The method of claim 17, further comprising detecting, by a voltage sensor, a voltage level of the ultracapacitor or the battery.

19. The method of claim 18, further comprising causing the one or more switches to transition to the closed state, in response to determining that a voltage differential between the ultracapacitor and the battery exceeds a threshold.

20. The method of claim 17, further comprising generating a charge to a user based on at least the one or more switches transitioning to the closed state.

21. The method of claim 17, further comprising removably electrically coupling the ultracapacitor to the power grid via a standard outlet.

22. The system of claim 1, wherein the controller is configured to cause the one or more switches to transition between the open state and the closed state based on at least the historical data.

* * * * *